United States Patent
Hara et al.

(10) Patent No.: US 8,923,856 B2
(45) Date of Patent: Dec. 30, 2014

(54) RADIO COMMUNICATION DEVICE, RADIO COMMUNICATION METHOD, AND STORAGE MEDIUM

(75) Inventors: Yasushi Hara, Kawasaki (JP); Youichi Kondou, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 694 days.

(21) Appl. No.: 13/064,439

(22) Filed: Mar. 24, 2011

(65) Prior Publication Data

US 2011/0294504 A1    Dec. 1, 2011

(30) Foreign Application Priority Data

May 31, 2010   (JP) ................................. 2010-123933

(51) Int. Cl.
*H04W 4/00*   (2009.01)
*H04W 48/16*   (2009.01)

(52) U.S. Cl.
CPC ............... *H04W 48/16* (2013.01); *Y02B 60/50* (2013.01)
USPC .......................................... 455/434; 370/338

(58) Field of Classification Search
None
See application file for complete search history.

(56) References Cited

U.S. PATENT DOCUMENTS

| 6,782,262 | B1* | 8/2004 | Lundborg ...................... 455/449 |
| 7,532,914 | B2 | 5/2009 | Kurokawa |
| 2008/0046542 | A1 | 2/2008 | Sano |
| 2010/0074236 | A1* | 3/2010 | Takeda et al. ................. 370/338 |

FOREIGN PATENT DOCUMENTS

| JP | 2004-312069 | 11/2004 |
| JP | 2005-175568 | 6/2005 |
| JP | 2005-175932 | 6/2005 |
| JP | 2006-013549 | 1/2006 |
| JP | 2006-270892 | 10/2006 |
| JP | 2008-35421 | 2/2008 |

* cited by examiner

*Primary Examiner* — German J Viana Di Prisco
(74) *Attorney, Agent, or Firm* — Staas & Halsey LLP

(57) ABSTRACT

A radio communication device includes a profile management unit configured to manage radio station profiles including identification information of radio stations and type information indicating whether the respective radio stations support voice communications; a receiving unit configured to receive a signal including the identification information from one of the radio stations; a first scanning unit configured to perform a scanning process on the radio stations supporting the voice communications to find a radio station to be connected; a second scanning unit configured to perform a scanning process on the radio stations not supporting the voice communications to find a radio station to be connected; and a scanning management unit configured to cause one or both of the first scanning unit and the second scanning unit to perform the scanning process according to the type information of the one of the radio stations that corresponds to the identification information in the received signal.

6 Claims, 23 Drawing Sheets

| CASE | VOICE AREA | | DATA AREA | | OPERATIONS |
|---|---|---|---|---|---|
| | HIGH FIELD INTENSITY | LOW FIELD INTENSITY | HIGH FIELD INTENSITY OR LOW FIELD INTENSITY | VOICE / DATA | |
| 1 | ✓ | | | VOICE | BEACON RECEPTION PROCESS |
| | | | | DATA | INACTIVE |
| 2 | | ✓ | | VOICE | INTRA-AREA SCANNING (HANDOVER) |
| | | | | DATA | INACTIVE |
| 3 | | | ✓ (screen on) | VOICE | INACTIVE |
| | | | | DATA | BECOME INACTIVE AFTER PREDETERMINED PERIOD OF TIME |
| 4 | | | ✓ WLAN-IF: OFF | VOICE | INACTIVE |
| | | | | DATA | INACTIVE |
| 5 | | | ✓ WLAN-IF: OFF (user operation) | VOICE | BECOME INACTIVE AFTER EXTRA-AREA SCANNING |
| | | | | DATA | PERFORM ASSOCIATION PROCESS AFTER SCANNING |

⇩ : SCREEN IS TURNED OFF    ⬍ : SCREEN IS TURNED ON IN RESPONSE TO USER OPERATION

FIG.3

| CASE | VOICE AREA | EXTRA AREA | DATA AREA | | OPERATIONS |
|---|---|---|---|---|---|
| 6 | | | | VOICE | BECOME INACTIVE AFTER EXTRA-AREA SCANNING |
| | | | | DATA | INACTIVE |
| 7 | | WLAN-IF: OFF | | VOICE | BECOME INACTIVE AFTER EXTRA-AREA SCANNING |
| | | USER OPERATION | | DATA | BECOME INACTIVE AFTER SCANNING |
| 8 | | | | VOICE | INACTIVE |
| | | | | DATA | BECOME INACTIVE AFTER EXTRA-AREA SCANNING |
| 9 | | WLAN-IF: OFF | WLAN-IF: OFF | VOICE | BECOME INACTIVE AFTER EXTRA-AREA SCANNING |
| | | USER OPERATION | | DATA | BECOME INACTIVE AFTER EXTRA-AREA SCANNING |
| 10 | | WLAN-IF: OFF | | VOICE | PERFORM ASSOCIATION PROCESS AFTER EXTRA-AREA SCANNING |
| | | USER OPERATION | | DATA | BECOME INACTIVE AFTER EXTRA-AREA SCANNING |
| 11 | WLAN-IF: OFF | WLAN-IF: OFF | | VOICE | PERFORM ASSOCIATION PROCESS AFTER SCANNING |
| | USER OPERATION | | | DATA | BECOME INACTIVE AFTER EXTRA-AREA SCANNING |

| SCANNING UNIT | SITUATION | SCANNING MODE | | |
|---|---|---|---|---|
| | | AUTO | PASSIVE | ACTIVE |
| VOICE | VOICE AREA | ACTIVE SCANNING AT 5-s INTERVAL | PASSIVE SCANNING AT 5-s INTERVAL | ACTIVE SCANNING AT 5-s INTERVAL |
| | EXTRA AREA | PASSIVE SCANNING (VARIABLE INTERVAL, MAXIMUM INTERVAL: 5 MIN) STOP SCANNING AFTER 30 MIN | | ACTIVE SCANNING (VARIABLE INTERVAL) STOP SCANNING AFTER 30 MIN |
| | WLAN-IF: ON | PASSIVE SCANNING (FIXED INTERVAL OF 5 MIN) STOP SCANNING AFTER 30 MIN | | ACTIVE SCANNING (FIXED INTERVAL OF 5 MIN) STOP SCANNING AFTER 30 MIN |
| | DATA AP IS FOUND | STOP SCANNING | | |
| | CONNECTABLE WLAN AP LIST IS TO BE DISPLAYED | PERFORM PASSIVE SCANNING ON ALL CHANNELS OF VOICE APs | | |
| DATA | CONNECTED WITH AP | TURN OFF WLAN-IF AFTER 15 MIN FROM SCREEN TURN-OFF | | |
| | DATA AREA → EXTRA AREA | PERFORM PASSIVE SCANNING ON APs IN HISTORY INFORMATION TURN OFF WLAN-IF AFTER 15 MIN FROM SCREEN TURN-OFF | | PERFORM ACTIVE SCANNING ON APs IN HISTORY INFORMATION TURN OFF WLAN-IF AFTER 15 MIN FROM SCREEN TURN-OFF |
| | WLAN-IF: ON → DATA AP IS FOUND | PERFORM PASSIVE SCANNING ON APs IN HISTORY INFORMATION PERFORM BEACON RECEPTION PROCESS AFTER AP IS FOUND | | PERFORM ACTIVE SCANNING ON APs IN HISTORY INFORMATION PERFORM BEACON RECEPTION PROCESS AFTER AP IS FOUND |
| | WLAN-IF: ON → VOICE AP IS FOUND | STOP SCANNING | | |
| | CONNECTABLE WLAN AP LIST IS TO BE DISPLAYED | PERFORM PASSIVE SCANNING ON ALL CHANNELS OF DATA APs | | |
| | BEACON INTENSITY BECOMES LOW | CONTINUE BEACON RECEPTION PROCESS WITHOUT PERFORMING SCANNING | | |

| CASE | VOICE AREA | | DATA AREA | | OPERATIONS |
|---|---|---|---|---|---|
| | HIGH FIELD INTENSITY | LOW FIELD INTENSITY | HIGH FIELD INTENSITY OR LOW FIELD INTENSITY | | |
| 1b | 📱 | | | VOICE | BEACON RECEPTION PROCESS |
| | | | | DATA | INACTIVE |
| 2b | | 📱 | | VOICE | INTRA-AREA SCANNING (HANDOVER) |
| | | | | DATA | INACTIVE |
| 3b | | | 📱 | VOICE | INACTIVE |
| | | | | DATA | BEACON RECEPTION PROCESS |
| 4b | | | 📱⇧📱 | VOICE | PERFORM EXTRA-AREA SCANNING AFTER DATA-AP SCANNING UNIT BECOMES INACTIVE |
| | | | | DATA | BECOME INACTIVE AFTER PREDETERMINED PERIOD OF TIME |
| 5b | | | 📱⬆📱 | VOICE | BECOME INACTIVE AFTER EXTRA-AREA SCANNING |
| | | | USER OPERATION | DATA | PERFORM ASSOCIATION PROCESS AFTER SCANNING |

⇧ : SCREEN IS TURNED OFF   ⬆ : SCREEN IS TURNED ON IN RESPONSE TO USER OPERATION

| SCANNING UNIT | SITUATION | SCANNING MODE | | |
|---|---|---|---|---|
| | | AUTO | PASSIVE | ACTIVE |
| VOICE | VOICE AREA | ACTIVE SCANNING AT 5-s INTERVAL | PASSIVE SCANNING AT 5-s INTERVAL | ACTIVE SCANNING AT 5-s INTERVAL |
| | EXTRA AREA | PASSIVE SCANNING (VARIABLE INTERVAL, MAXIMUM INTERVAL: 5 MIN) | | ACTIVE SCANNING (VARIABLE INTERVAL) |
| | CONNECTED WITH DATA AP (RECEIVING BEACON) | INACTIVE | | |
| | 15 MIN PASSED IN DATA AREA (DATA-AP SCANNING UNIT BECOMES INACTIVE) | PASSIVE SCANNING (FIXED INTERVAL OF 5 MIN) | PASSIVE SCANNING (FIXED INTERVAL OF 5 MIN) | ACTIVE SCANNING (FIXED INTERVAL OF 5 MIN) |
| | DATA AREA → EXTRA AREA | PASSIVE SCANNING (FIXED INTERVAL OF 5 MIN) | PASSIVE SCANNING (FIXED INTERVAL OF 5 MIN) | ACTIVE SCANNING (FIXED INTERVAL OF 5 MIN) |
| | SCREEN IS TURNED ON IN DATA AREA | PASSIVE SCANNING (FIXED INTERVAL OF 5 MIN) STOP SCANNING WHEN CONNECTED WITH AP | PASSIVE SCANNING (FIXED INTERVAL OF 5 MIN) STOP SCANNING WHEN CONNECTED WITH AP | ACTIVE SCANNING (FIXED INTERVAL OF 5 MIN) STOP SCANNING WHEN CONNECTED WITH AP |
| | SCREEN IS TURNED ON IN EXTRA AREA | PASSIVE SCANNING (FIXED INTERVAL OF 5 MIN) | PASSIVE SCANNING (FIXED INTERVAL OF 5 MIN) | ACTIVE SCANNING (FIXED INTERVAL OF 5 MIN) |
| | CONNECTABLE WLAN AP LIST IS TO BE DISPLAYED | PERFORM PASSIVE SCANNING ON ALL CHANNELS OF VOICE APs | | |
| DATA | CONNECTED WITH AP | STOP RECEIVING BEACON AFTER 15 MIN FROM SCREEN TURN-OFF | | |
| | DATA AREA → EXTRA AREA | PERFORM PASSIVE SCANNING ON APs IN HISTORY INFORMATION STOP RECEIVING BEACON AFTER 15 MIN FROM SCREEN TURN-OFF | PERFORM PASSIVE SCANNING ON APs IN HISTORY INFORMATION STOP RECEIVING BEACON AFTER 15 MIN FROM SCREEN TURN-OFF | PERFORM ACTIVE SCANNING ON APs IN HISTORY INFORMATION STOP RECEIVING BEACON AFTER 15 MIN FROM SCREEN TURN-OFF |
| | SCREEN: ON → DATA AP IS FOUND | PERFORM PASSIVE SCANNING ON APs IN HISTORY INFORMATION PERFORM BEACON RECEPTION PROCESS AFTER AP IS FOUND | PERFORM PASSIVE SCANNING ON APs IN HISTORY INFORMATION PERFORM BEACON RECEPTION PROCESS AFTER AP IS FOUND | PERFORM ACTIVE SCANNING ON APs IN HISTORY INFORMATION PERFORM BEACON RECEPTION PROCESS AFTER AP IS FOUND |
| | SCREEN: ON → VOICE AP IS FOUND | STOP SCANNING | | |
| | CONNECTABLE WLAN AP LIST IS TO BE DISPLAYED | PERFORM PASSIVE SCANNING ON ALL CHANNELS OF DATA APs | | |
| | BEACON INTENSITY BECOMES LOW | CONTINUE BEACON RECEPTION PROCESS WITHOUT PERFORMING SCANNING | | |

RADIO COMMUNICATION DEVICE, RADIO COMMUNICATION METHOD, AND STORAGE MEDIUM

CROSS-REFERENCE TO RELATED APPLICATION

This application is based upon and claims the benefit of priority of the prior Japanese Patent Application No. 2010-123933 filed on May 31, 2010, the entire contents of which are incorporated herein by reference.

FIELD

The embodiments discussed herein are related to a radio communication device.

BACKGROUND

There are mobile phones including a wireless local area network (WLAN) interface for connection with a WLAN. Such mobile phones include a function for packet communications via a WLAN in addition to a basic function for circuit-switched communications.

Generally, mobile phones use a WLAN for voice communications and data communications. Voice communications are performed using an IP phone technology where packetized voice information is transmitted and received via the voice over Internet protocol (VoIP). Voice communications via a WLAN, for example, make it possible to use mobile phones as internal phones in a company. An example of data communications is Web browsing on the Internet. A mobile phone including a full browser enables browsing Web sites designed for personal computers.

For voice communications, to be able to respond to an incoming call at any time, it is preferable to keep a mobile phone ready for communications with an access point (AP), a radio station for the WLAN. When the mobile phone moves away from the AP or the signal strength of a beacon from the AP becomes low for some reason, the mobile phone performs a scanning process to search for another AP (see, for example, Japanese Laid-Open Patent Publication No. 2005-175932). Here, since it is no use performing a scanning process in an out-of-service area, a method has been proposed to reduce the number of times the scanning process is performed. In the proposed method, the scan interval is gradually increased to reduce wasteful power consumption caused by unnecessary scanning (see, for example, Japanese Laid-Open Patent Publication No. 2006-13549).

Meanwhile, data communications such as Web browsing are generally started by user operations. Therefore, if a mobile phone does not include a function for voice communications via the WLAN, the WLAN interface of the mobile phone may be turned off when data communications are completed or after a predetermined period of time from the end of data communications to reduce the power consumption.

SUMMARY

According to an aspect of the invention, there is provided a radio communication device communicating with other communication devices via radio stations. The radio communication device includes a profile management unit configured to manage radio station profiles including identification information of the radio stations and type information indicating whether the respective radio stations support voice communications; a receiving unit configured to receive a signal including the identification information from one of the radio stations; a first scanning unit configured to perform a scanning process on the radio stations corresponding to the radio station profiles and supporting the voice communications to find a radio station to be connected; a second scanning unit configured to perform a scanning process on the radio stations corresponding to the radio station profiles and not supporting the voice communications to find a radio station to be connected; and a scanning management unit configured to cause one or both of the first scanning unit and the second scanning unit to perform the scanning process according to the type information of the one of the radio stations that corresponds to the identification information in the received signal.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 3 is a table used to describe operations of a radio communication device in communication areas according to a first embodiment;

FIG. 4 is a table used to describe operations of a radio communication device in various situations according to the first embodiment;

FIG. 5 is a table used to describe operations of a voice-AP scanning unit and a data-AP scanning unit according to the first embodiment;

FIG. 15 is a table used to describe operations of a radio communication device in communication areas according to a second embodiment;

FIG. 17 is a table used to describe operations of a voice-AP scanning unit and a data-AP scanning unit according to the second embodiment;

DESCRIPTION OF EMBODIMENTS

A radio communication device including a WLAN interface preferably has both a voice communication function and a data communication function. Also, reducing the power consumption of such a radio communication device in various communication environments may improve the usability of the radio communication device.

One aspect of this disclosure makes it possible to provide a radio communication device that operates according to various situations in communications via radio stations to reduce the power consumption necessary for establishing connections with the radio stations.

Preferred embodiments of the present invention will be described with reference to the accompanying drawings.

Figure 1:
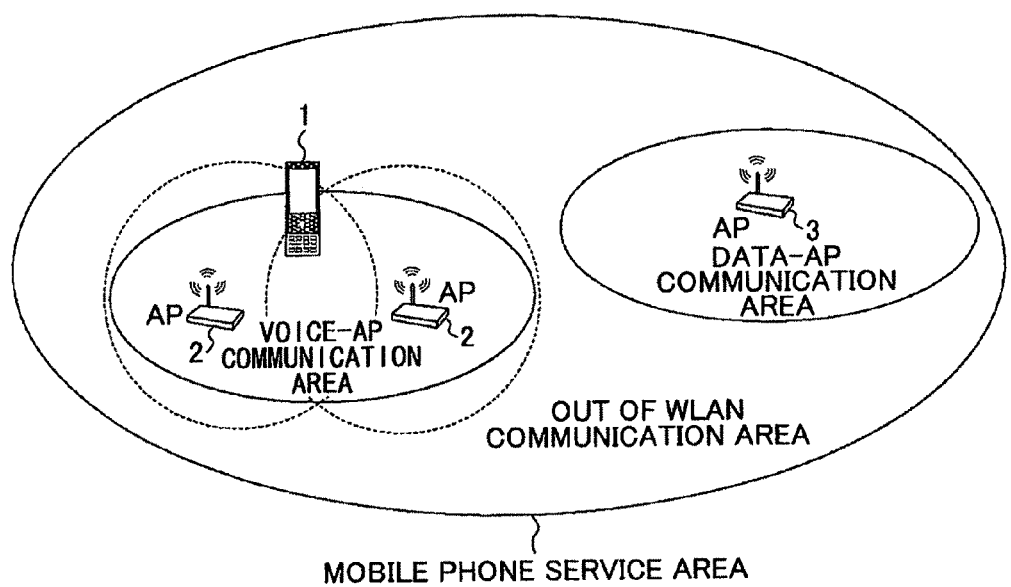
FIG. 1 is a drawing illustrating an exemplary radio communication environment.

In the descriptions below, a mobile phone is used as an example of a radio communication device. A mobile phone 1 in FIG. 1 is able to perform circuit-switched communications in a mobile phone service area established by a telecommunications carrier and to perform packet communications in communication areas of access points (AP) that are radio stations for the WLAN. The mobile phone 1 includes packet communication functions including a voice communication function for voice communications and a data communication function for data communications such as Web browsing on the Internet. In this example, voice communications are available in the communication area (voice-AP communication area) of voice APs 2 connected to an IP phone network including a session initiation protocol (SIP) server (not shown). Data communications such as Web browsing are available in the communication area (data-AP communication area) of a data AP 3 not supporting voice communications and in the communication area of the voice APs 2.

A communication area of the WLAN is formed by one or more access points (voice/data APs). When forming one communication area with multiple access points conforming to IEEE 802.11b/g, the radio interference between the access points can be prevented by assigning up to four channels out of 14 or 13 channels to each of the access points. Accordingly, it is possible to form a communication area of a desired size by arranging multiple access points such that neighboring access points use different channels and the coverage areas of the access points overlap each other. An extended service set identifier (ESSID) is assigned to each communication area formed by one or more access points (or to the access points forming the communication area).

The voice communication function of the mobile phone 1 may be used, for example, for an internal phone system of a company. For example, the mobile phone 1 may be used as an internal phone in a voice-AP communication area in the office and used as an Internet terminal in a data-AP communication area at home or in a "hot spot" (wireless LAN service area). Also, the mobile phone 1 may be used as a personal IP phone to talk with another person via the Internet.

Although one voice-AP communication area and one data-AP communication area are illustrated in FIG. 1, any number of AP communication areas may be provided. For example, in an internal phone network, a voice-AP communication area may be formed for each department or room in the office. In this case, as described later in detail, profiles of multiple voice-AP communication areas may be registered in profile configuration information so that the user can use the mobile phone 1 in any one of the voice-AP communication areas.

Although the voice-AP communication area and the data-AP communication area are in the mobile phone service area in FIG. 1, the present invention is not limited to the example illustrated in FIG. 1. For example, the whole or a part of the voice-AP communication area and/or the data-AP communication area may be located outside of the mobile phone service area. In packet communications using the WLAN, it is important to determine whether the mobile phone 1 is located in the voice-AP communication area, in the data-AP communication area, or out of the AP communication areas. In other words, whether the mobile phone 1 is located in or out of the mobile phone service area is not an important factor.

Here, if SIP registration of the mobile phone 1 has not been done with the voice AP 2, the voice AP 2 functions as a data AP for the mobile phone 1. Meanwhile, if the data AP 3 supports SIP registration and SIP registration of the mobile phone 1 has been done with the data AP 3, the data AP 3 functions as a voice AP for the mobile phone 1.

Figure 2:
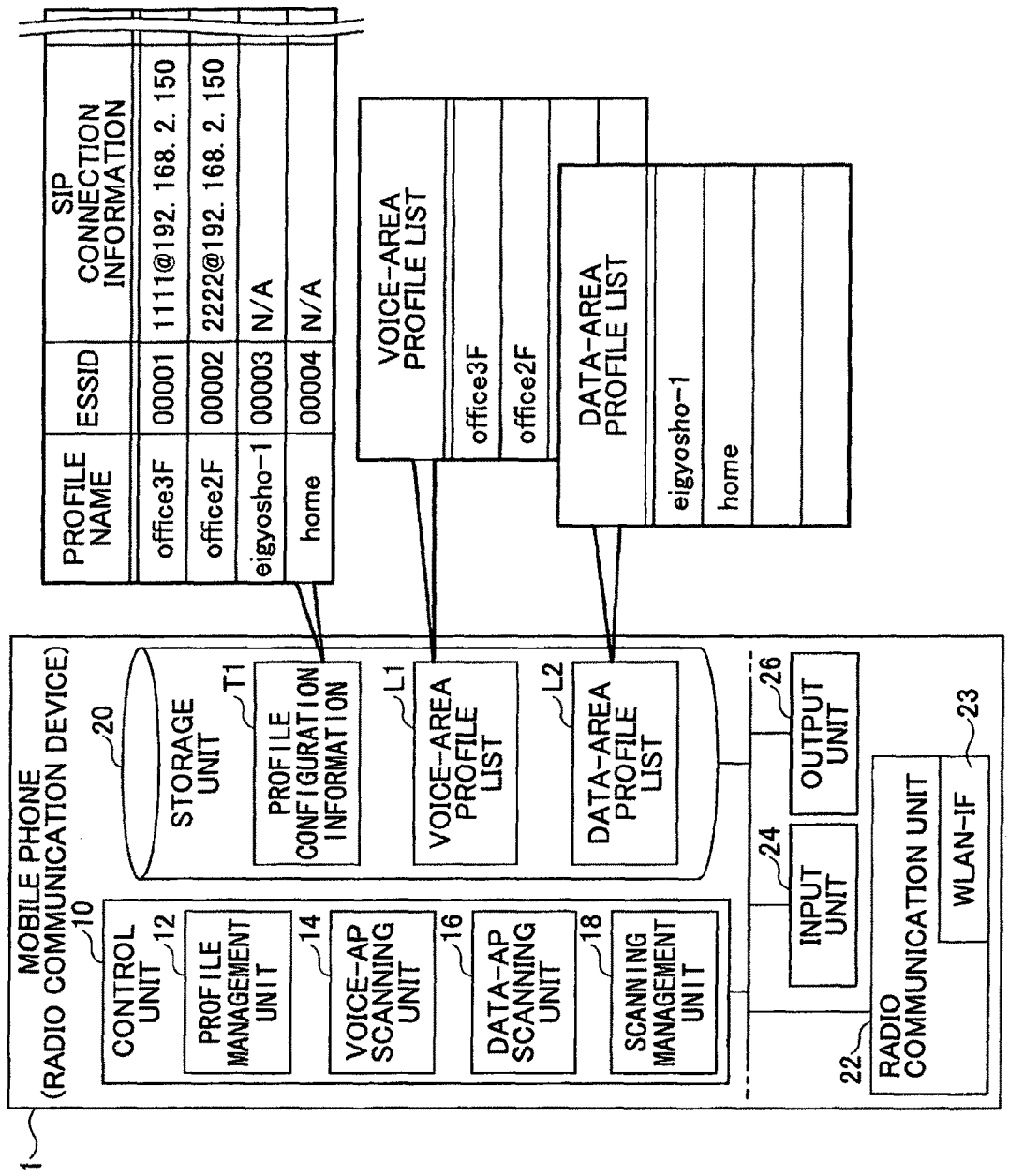
FIG. 2 is a drawing illustrating an exemplary configuration of a radio communication device.

FIG. 2 is a drawing illustrating an exemplary configuration of the mobile phone (radio communication device) 1. The mobile phone 1 includes a control unit 10, a storage unit 20, a radio communication unit 22, an input unit 24, an output unit 26, and a battery (not shown) used as a driving power supply. The control unit 10 is a computer including a central processing unit (CPU) as a hardware component and controls the mobile phone 1. The storage unit 20 is implemented by a non-volatile memory and stores control programs and various data including user data. The radio communication unit 22 includes a WLAN interface (WLAN-IF) 13 for connecting the mobile phone 1 to the WLAN, and transmits and receives high-frequency signals for mobile phone communications and WLAN communications. The input unit 24 is a user interface for operating the mobile phone 1 and includes, for example, operation keys, a touch panel, and a microphone for a telephone conversation. The output unit 26 is a user interface for displaying information and includes a liquid crystal panel and a light emitting diode (LED). The output unit 26 also includes a speaker for a telephone conversation. The control unit 10 includes four functional components for connection with the WLAN: a profile management unit 12, a voice-AP scanning unit 14, a data-AP scanning unit 16, and a scanning management unit 18. The four functional components are implemented by executing a program by the control unit 10.

The profile management unit 12 manages profile configuration information T1 stored in the storage unit 20. The profile configuration information T1 is a data table containing fields (or information items) such as "profile name", "ESSID", "SIP connection information", and "channel" (not shown) representing profiles (or network configurations) of communication areas (or access points) to be connected. The storage unit 20 also stores a voice-area profile list L1 and a data-area profile list L2 that are used as type information indicating types of profiles registered in the profile configuration information T1. The voice-area profile list L1 lists voice-area profiles representing communication areas (or access points) supporting voice communications out of the profiles registered in the profile configuration information T1. The data-area profile list L2 lists data-area profiles representing communication areas (or access points) not supporting voice communications out of the profiles registered in the profile configuration information T1. The profile management unit 12 registers a profile in the profile configuration information T1 according to information entered by the user.

The profile management unit 12 classifies the profile as a voice-area profile or a data-area profile according to the content of the field "SIP connection information". In this embodiment, if the field "SIP connection information" of a profile contains valid information for connecting with a SIP server, the profile is classified as a voice-area profile and otherwise, the profile is classified as a data-area profile. Also, when receiving a signal from an AP, the profile management unit 12 obtains the ESSID of the AP, determines whether the profile corresponding to the obtained ESSID is a voice-area profile or a data-area profile, and registers the profile in the voice-area profile list L1 or the data-area profile list L2 based on the determination result.

Although the voice-area profile list L1 and the data-area profile list L2 are provided separately from the profile configuration information T1 in the example illustrated in FIG. 2, a field indicating a type of a profile, i.e., a voice-area profile or a data-area profile, may be provided in the profile configuration information T1. As long as the types of profiles can be identified, the profiles may be recorded in any format suitable for a retrieval method.

The voice-AP scanning unit 14 performs a scanning process to search for an AP or to maintain the connection with an AP based only on voice-area profiles listed in the voice-area profile list L1. In the example of FIG. 2, the voice-AP scanning unit 14 performs a scanning process based on profiles "office3F" and "office2F" (profiles used for the scanning process are hereafter called "target profiles"). The voice-AP scanning unit 14 selects one of the target profiles and determines, in collaboration with the WLAN interface 23, whether it is possible to communicate with the corresponding AP via one of channels registered in the selected target profile. If it is possible to communicate with the AP, the voice-AP scanning unit 14 communicates with the AP to establish a connection. If the signal strength is not sufficient to communicate with the AP, the voice-AP scanning unit 14 tries to communicate with the AP via another one of the registered channels. If it is not possible to communicate with the AP via all the registered channels, the voice-AP scanning unit 14 selects another one of the target profiles and repeats the above process. If it is not possible to communicate with any one of the APs registered in the target profiles, it means that the mobile phone 1 is outside of the voice-AP communication area or in a similar situation.

In this case, the voice-AP scanning unit 14 performs a scanning process (extra-area scanning process) where the WLAN interface 23 is less-frequently used.

The data-AP scanning unit 16 performs a scanning process to search for an AP or to maintain the connection with an AP based only on data-area profiles listed in the data-area profile list L2. In the example of FIG. 2, the data-AP scanning unit 16 performs a scanning process based on profiles "eigyosho-1" and "home". The scanning process performed by the data-AP scanning unit 16 is similar to that performed by the voice-AP scanning unit 14, and the detailed descriptions of the scanning process are omitted here.

There are two typical methods for the scanning process performed by the voice-AP scanning unit 14 and the data-AP scanning unit 16. One of the methods is passive scanning where the mobile phone 1 waits for beacons from APs and the other one of the methods is active scanning where the mobile phone 1 broadcasts a probe request including an ESSID(s). In the mobile phone 1 of this embodiment, three scanning modes are provided for the scanning process. The three modes include "auto" (automatic), "passive" (passive scanning), and "active" (active scanning). The passive mode has an advantage in terms of saving power and the active mode has an advantage in terms of reducing the time for establishing a connection. The auto mode where the passive mode and the active mode are switched is used as a default mode. The user can specify one of the three modes. Details of the three modes are described later.

The scanning management unit 18 activates or deactivates one or both of the voice-AP scanning unit 14 and the data-AP scanning unit 16 according to status changes of the mobile phone 1. For example, when the mobile phone 1 is connected with an AP, the scanning management unit 18 activates (or maintains the operation of) one of the voice-AP scanning unit 14 and the data-AP scanning unit 16 and deactivates (or stops) the other one of them. More specifically, the scanning management unit 18 deactivates the data-AP scanning unit 16 when the mobile phone 1 is connected with a voice AP and deactivates the voice-AP scanning unit 14 when the mobile phone 1 is connected with a data AP.

In the mobile phone 1 configured as described above, different scanning processes are performed depending on whether a voice AP or a data AP is available for communication. When the mobile phone 1 is in the voice-AP communication area, the connection is continuously maintained to allow the mobile phone 1 to quickly respond to an incoming voice call. Meanwhile, when the mobile phone 1 is in the data-AP communication area, the connection is maintained only while WLAN communications are being performed. Also, when the mobile phone 1 is in an area where the voice-AP communication area and the data-AP communication area overlap each other, it is assumed that the mobile phone 1 is in the voice-AP communication area (i.e., the voice-AP communication area is given priority over the data-AP communication area) and the connection is continuously maintained.

The mobile phone 1 is used in various situations with respect to the WLAN. For example, there are situations where the mobile phone 1 is connected with an AP, where the mobile phone 1 is in a standby state in which some of the functions are deactivated to save power, where an operation to cause the mobile phone 1 to return from the standby state is performed, and where the mobile phone 1 moves out of or into a communication area. Operations of the mobile phone 1 in various situations (or cases) are described below as first and second embodiments of the present invention.

In the descriptions below and in the drawings used for the descriptions, "WLAN-IF: OFF" indicates that power supply to the WLAN interface 23 is stopped, and "out-of-service area" and "extra area" indicate that the mobile phone 1 is neither in the voice-AP communication area nor in the data-AP communication area. Also, the voice-AP communication area may be abbreviated to "voice area" and the data-AP communication area may be abbreviated to "data area".

First Embodiment

In the first embodiment, the supply of driving power to the WLAN interface 23 is stopped when conditions are met. FIG. 3 is a table used to describe operations of the mobile phone 1 in communication areas according to the first embodiment.

[Case 1]

When the field intensity of a beacon from an associated (or connected) AP in the voice-AP communication area is sufficiently high (high field intensity), the voice-AP scanning unit 14 receives the beacon, which is transmitted at regular intervals (e.g., at 100 ms intervals) from the AP, at an interval of, for example, 1 second and monitors the field intensity of the received beacon (beacon reception process). In this case, the data-AP scanning unit 16 is inactive.

[Case 2]

When the field intensity of a beacon from an associated AP is relatively low (low field intensity) in the voice-AP communication area, the voice-AP scanning unit 14 performs a scanning process (may be called an intra-area scanning process or a handover process) to search for another AP. In this case, the scanning process is performed only on APs corresponding to the profiles registered in the voice-area profile list L1. That is, the data-AP scanning unit 16 is inactive and APs corresponding to the profiles listed in the data-area profile list L2 are not searched. Compared with a method where all APs including data APs are searched, this method makes it possible to more quickly find a desired AP since only voice APs are searched.

This in turn makes it possible to reduce the power consumption, and also makes it possible to reduce an interruption or noise caused by the scanning process during a telephone conversation and to improve the voice quality.

[Case 3]

When the WLAN interface 23 is ON (power is being supplied to the WLAN interface 23) in the data-AP communication area, the data-AP scanning unit 16 receives a beacon. In the data-AP communication area, the voice-AP scanning unit 14 is normally inactive. When the backlight of the liquid crystal panel is turned off (the screen is turned off) to save power and a predetermined period of time (e.g., 0, 5, or 15 minutes) passes after the screen is turned off, the WLAN interface 23 is turned off and the data-AP scanning unit 16 becomes inactive.

[Case 4]

When the WLAN interface 23 is OFF (power is not being supplied to the WLAN interface 23) in the data-AP communication area, the voice-AP scanning unit 14 and the data-AP scanning unit 16 are both inactive.

[Case 5]

When the screen is turned on in response to a user operation while the WLAN interface 23 is OFF in the data-AP communication area, the data-AP scanning unit 16 performs a scanning process to search for an AP. The scanning process is performed on APs corresponding to the profiles registered in the data-area profile list L2. Concurrently, the voice-AP scanning unit 14 performs an extra-area scanning process. In this case, the extra-area scanning process is performed according to a fixed-interval method where the reception of a beacon (in the passive mode) or the broadcasting of a probe request (in the active mode) is performed at a fixed interval. The fixed interval is the same as the maximum interval (e.g., 5 minutes) in the extra-area scanning process performed according to a variable-interval method described later.

In other words, since it is unlikely to be able to find a voice AP, the extra-area scanning process is performed less frequently to save power. When finding an AP, the data-AP scanning unit 16 performs an authentication process and an association process with the AP and as a result, the mobile phone 1 is associated with the AP. When the association is reported by the data-AP scanning unit 16 to the scanning management unit 18, the scanning management unit 18 immediately deactivates the voice-AP scanning unit 14.

FIG. 4 is a table used to describe operations of the mobile phone 1 in various situations according to the first embodiment.

[Case 6]

When the mobile phone 1 moves from the voice-AP communication area to the out-of-service area (extra area) as indicated by an arrowed dotted line in FIG. 4, the voice-AP scanning unit 14 starts the extra-area scanning process. Meanwhile, the data-AP scanning unit 16 is inactive. In this case, the extra-area scanning process is performed according to a variable-interval method where the reception of a beacon (in the passive mode) or the broadcasting of a probe request (in the active mode) is performed frequently (at a short interval) immediately after the extra-area scanning process is started, and the interval is gradually increased thereafter. For example, the interval is changed from two seconds up to five minutes. Thus, in the variable-interval method, the frequency of searching for an AP is gradually reduced as time passes. In a situation where the mobile phone 1 returns to the voice-AP communication area after moving to the out-of-service area, the variable-interval method enables the mobile phone 1 to establish a connection with an AP immediately after returning to the voice-AP communication area. If no AP is found after a predetermined period of time (e.g., 30 minutes) from the start of the extra-area scanning process, the WLAN interface 23 is turned off and the voice-AP scanning unit 14 becomes inactive.

[Case 7]

When the user operates the mobile phone 1 to turn on (or unlock) the screen while the WLAN interface 23 is OFF in the out-of-service area, the voice-AP scanning unit 14 starts the extra-area scanning process. In this case, the extra-area scanning process is performed according to the fixed-interval method. If no AP is found after a predetermined period of time (e.g., 30 minutes) from the start of the extra-area scanning process, the WLAN interface 23 is turned off and the voice-AP scanning unit 14 becomes inactive. In parallel with the extra-area scanning process by the voice-AP scanning unit 14, the data-AP scanning unit 16 performs a scanning process. If no AP is found after trying all channels defined in the registered data-area profiles, the data-AP scanning unit 16 becomes inactive.

[Case 8]

When the mobile phone 1 moves from a data-AP communication area to the out-of-service area during communications, the data-AP scanning unit 16 performs an extra-area scanning process based on history information to search for an AP in a data-AP communication area to which a previously-connected AP belongs. Meanwhile, the voice-AP scanning unit 14 is inactive. In this case, no AP will be found. Therefore, after a predetermined period of time (e.g., 0, 5, or 15 minutes) from when the screen is turned off, the WLAN interface 23 is turned off and the data-AP scanning unit 16 becomes inactive.

[Case 9]

When the mobile phone 1 moves from the data-AP communication area to the out-of-service area with the WLAN interface 23 turned off and the user operates the mobile phone 1 to turn on (or unlock) the screen in the out-of-service area, the voice-AP scanning unit 14 starts an extra-area scanning process and concurrently, the data-AP scanning unit 16 performs an extra-area scanning process. The voice-AP scanning unit 14 performs the extra-area scanning process according to the fixed-interval method where scanning is performed at the maximum interval from the start. In this case, no AP will be found. Therefore, the voice-AP scanning unit 14 becomes inactive after a predetermined period of time (e.g., 30 minutes) and the data-AP scanning unit 16 becomes inactive after performing the extra-area scanning process on channels registered in the data-area profiles.

When the voice-AP scanning unit 14 becomes inactive, the scanning management unit 18 turns off the WLAN interface 23.

[Case 10]

When the user operates the mobile phone 1 to turn on (or unlock) the screen while the mobile phone 1 is in the out-of-service area and the WLAN interface 23 is OFF and then the mobile phone 1 moves from the out-of-service area into the voice-AP communication area, the voice-AP scanning unit 14 starts an extra-area scanning process and concurrently, the data-AP scanning unit 16 performs an extra-area scanning process. In this case, the voice-AP scanning unit 14 performs the extra-area scanning process according to the fixed-interval method where scanning is performed at the maximum interval from the start. When finding an AP in the voice-AP communication area, the voice-AP scanning unit 14 performs an authentication process and an association process with the AP and as a result, the mobile phone 1 is associated with the AP. When the association is reported by the voice-AP scanning unit 14 to the scanning management unit 18, the scanning management unit 18 immediately deactivates the data-AP scanning unit 16.

[Case 11]

When the mobile phone 1 moves from the out-of-service area to the voice-AP communication area with the WLAN interface 23 turned off and then the user operates the mobile phone 1 to turn on (or unlock) the screen in the voice-AP communication area, the voice-AP scanning unit 14 and the data-AP scanning unit 16 perform scanning processes. When the voice-AP scanning unit 14 finds an AP and the mobile phone 1 is associated with the AP, the scanning management unit 18 deactivates the data-AP scanning unit 16.

FIG. 5 is a table used to describe operations of the voice-AP scanning unit 14 and the data-AP scanning unit 16 in different scanning modes.

[Operations of Voice-AP Scanning Unit]

In the voice-AP communication area, the voice-AP scanning unit 14 performs the active scanning at a 5-s interval if the auto mode or the active mode is specified, or performs the passive scanning at a 5-s interval if the passive mode is specified. In the out-of-service area, the voice-AP scanning unit 14 performs the passive scanning according to the variable-interval method if the auto mode or the passive mode is specified, or performs the active scanning according to the variable-interval method if the active mode is specified. When the WLAN interface 23 is turned on, the voice-AP scanning unit 14 performs the passive scanning at a 5-min interval if the auto mode or the passive mode is specified, or performs the active scanning at a 5-min interval if the active mode is specified. When an AP is found by the data-AP scanning unit 16, the voice-AP scanning unit 14 stops the scanning process regardless of the scanning mode. When a connectable WLAN AP list is to be displayed in response to a user operation, the voice-AP scanning unit 14 performs the passive scanning based on the voice-area profiles regardless of the scanning mode. Here, the connectable WLAN AP list indicates a list of connectable APs to be displayed on a WLAN setting screen. When the WLAN setting screen is to be displayed, passive scanning is performed to receive beacons from APs, ESSIDs are obtained from the beacons, and a list of connectable APs are displayed based on the ESSIDs. The user selects an AP from the list and if the AP is protected, enters a password to connect to the selected AP.

[Operations of Data-AP Scanning Unit]

When the mobile phone 1 is connected with an AP, the data-AP scanning unit 16 turns off the WLAN interface 23 after, for example, 15 minutes from when the screen is turned off regardless of the scanning mode. When the mobile phone 1 connected with an AP moves to the out-of-service area, the data-AP scanning unit 16 performs the passive scanning on APs in the history information if the auto mode or the passive mode is specified, or performs the active scanning on APs in the history information if the active mode is specified. When the WLAN interface 23 is turned on, the data-AP scanning unit 16 performs the passive scanning on APs in the history information if the auto mode or the passive mode is specified, or performs the active scanning on APs in the history information if the active mode is specified. After an AP is found, the data-AP scanning unit 16 starts a beacon reception process regardless of the scanning mode. When an AP is found by the voice-AP scanning unit 14, the data-AP scanning unit 16 stops the scanning process regardless of the scanning mode. When a connectable WLAN AP list is to be displayed, the data-AP scanning unit 16 performs the passive scanning based on the data-area profiles regardless of the scanning mode. Even if the field intensity of the beacon becomes low while the mobile phone 1 is connected with an AP, the data-AP scanning unit 16 continues the beacon reception process without performing a handover process.

Operations of the mobile phone 1 of the first embodiment are described below with reference to flowcharts. In the flowcharts, it is assumed that the auto mode is specified as the scanning mode.

Figure 6:
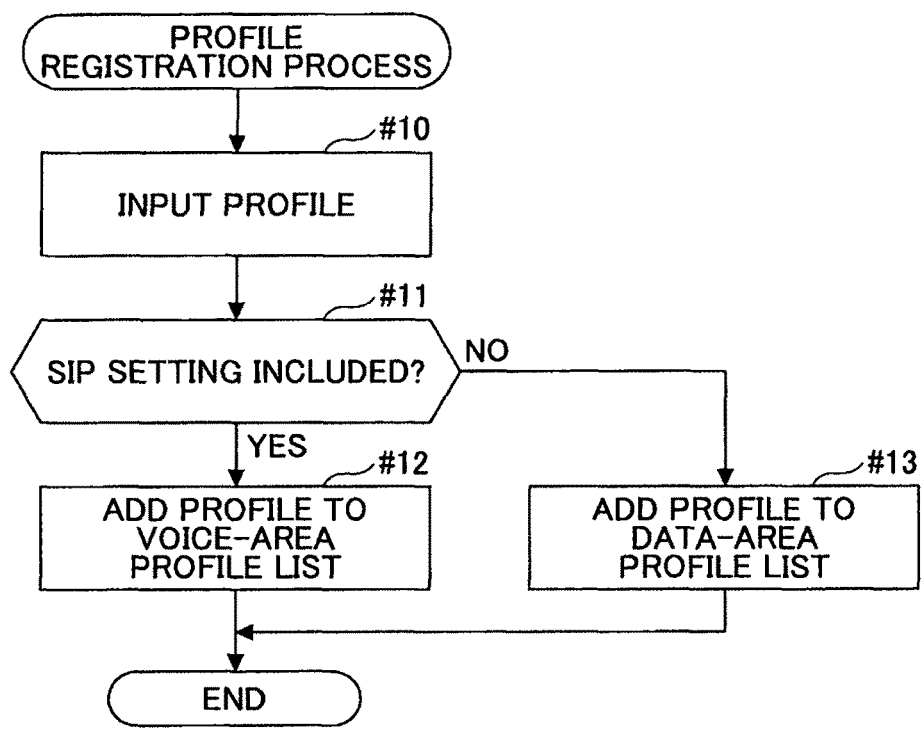
FIG. 6 is a flowchart used to describe a profile registration process.

FIG. 6 is a flowchart used to describe a profile registration process performed by the profile management unit 12.

The profile management unit 12 registers a profile input by the user in the profile configuration information T1 (#10) and determines whether a SIP setting (or SIP connection information) is in the input profile (#11). If there is a SIP setting in the profile, the profile management unit 12 adds the profile to the voice-area profile list L1 (#12). If there is no SIP setting in the profile, the profile management unit 12 adds the profile to the data-area profile list L2 (#13).

Figure 7:
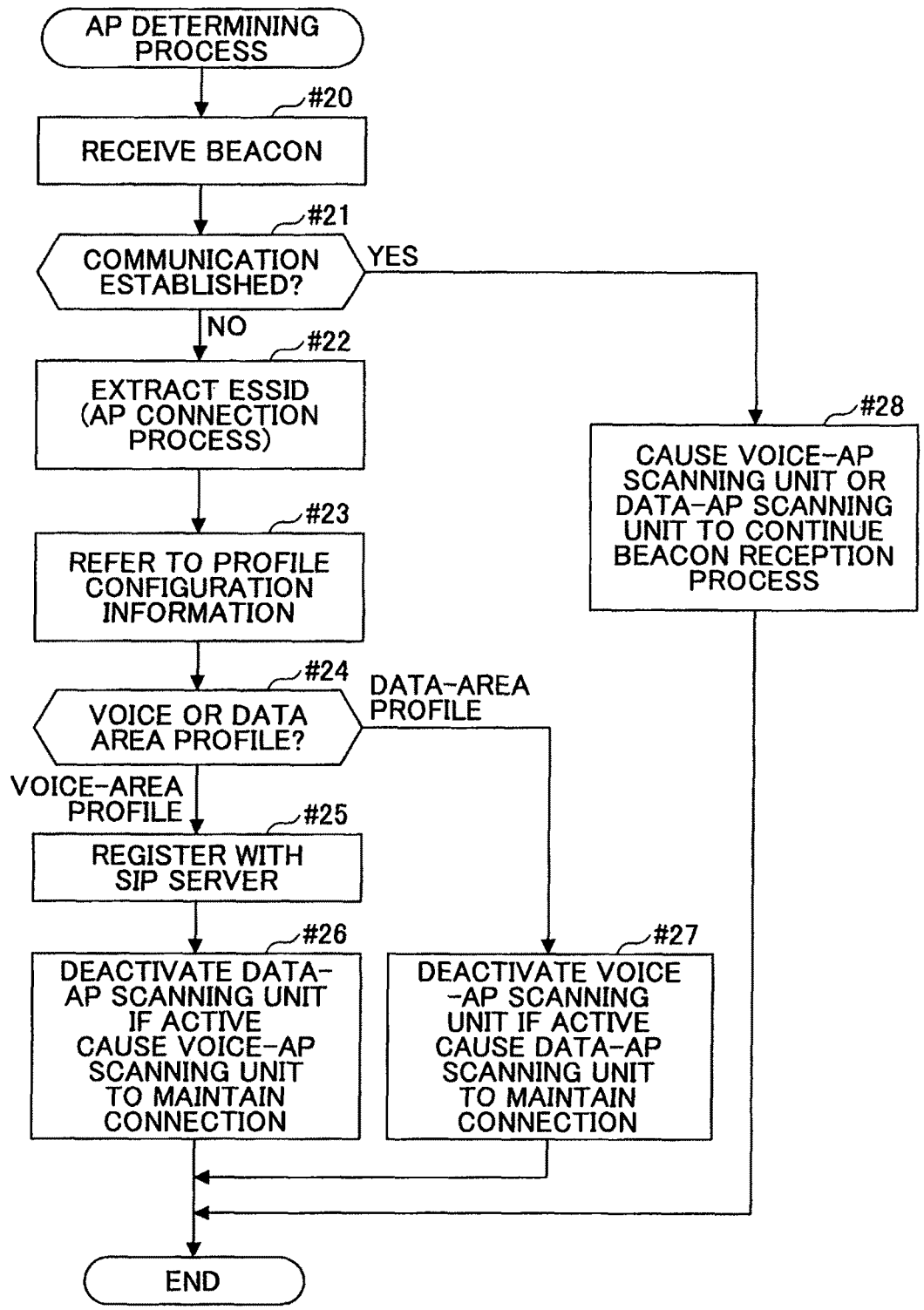
FIG. 7 is a flowchart used to describe an AP determining process.

FIG. 7 is a flowchart used to describe an AP determining process performed by the scanning management unit 18. The scanning management unit 18 receives a beacon via the WLAN interface 23 (#20) and determines whether communication has already been established with an AP (#21). If communication has been established (YES in #21), the scanning management unit 18 causes the voice-AP scanning unit 14 or the data-AP scanning unit 16, which is currently performing the beacon reception process, to continue receiving the beacon (#28). Meanwhile, if communication has not been established (NO in #21), the scanning management unit 18 performs a process for establishing a connection with an AP.

In this process, the scanning management unit 18 extracts an ESSID from the beacon (#22) and determines whether the extracted ESSID corresponds to a voice-area profile or a data-area profile by referring to the profile configuration information T1 (#23, #24). When the extracted ESSID corresponds to a voice-area profile, the scanning management unit 18 performs a process for connecting (or registering) with a SIP server (#25) and requests the voice-AP scanning unit 14 to start a process for maintaining the connection (#26). Also in this step, if the data-AP scanning unit 16 is active, the scanning management unit 18 deactivates the data-AP scanning unit 16. When the extracted ESSID corresponds to a data-area profile, the scanning management unit 18 requests the data-AP scanning unit 16 to start a process for maintaining the connection (#27). Also in this step, if the voice-AP scanning unit 14 is active, the scanning management unit 18 deactivates the voice-AP scanning unit 14.

Figure 8:
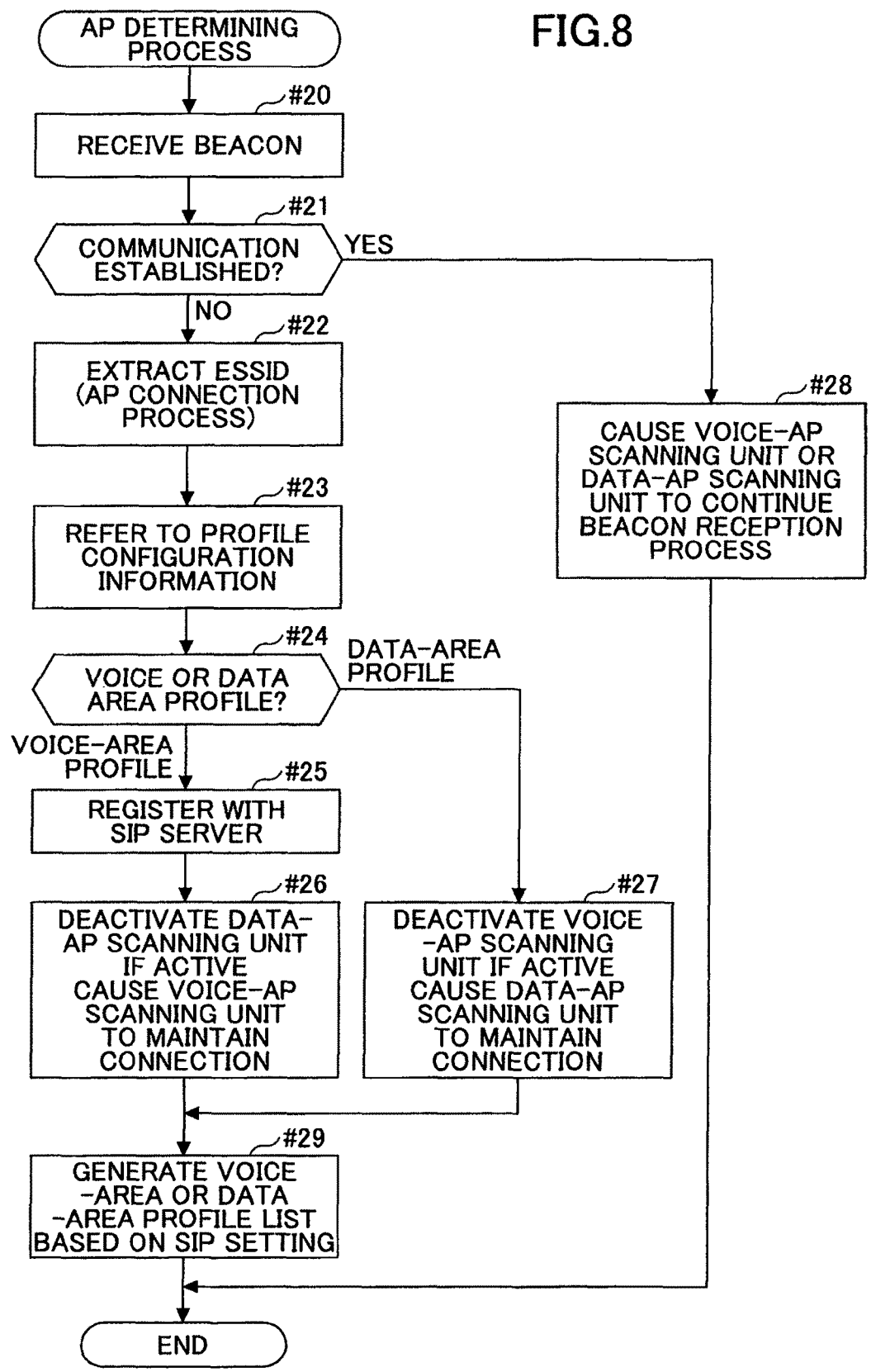
FIG. 8 is a flowchart used to describe a variation of the AP determining process of FIG. 7.

FIG. 8 is a flowchart used to describe a variation of the AP determining process of FIG. 7. In this variation, the profile management unit 12 automatically generates a profile list when the mobile phone 1 is connected with an AP. After the scanning management unit 18 requests the voice-AP scanning unit 14 or the data-AP scanning unit 16 to start a process for establishing a connection in a manner similar to FIG. 7 (#20-#27), the profile management unit 12 generates the voice-area profile list L1 or the data-area profile list L2 (#29). When the ESSID extracted from the beacon corresponds to a voice-area profile including a SIP setting, the profile management unit 12 generates the voice-area profile list L1. Meanwhile, when the ESSID extracted from the beacon corresponds to a data-area profile not including a SIP setting, the profile management unit 12 generates the data-area profile list L2.

Figure 9A:
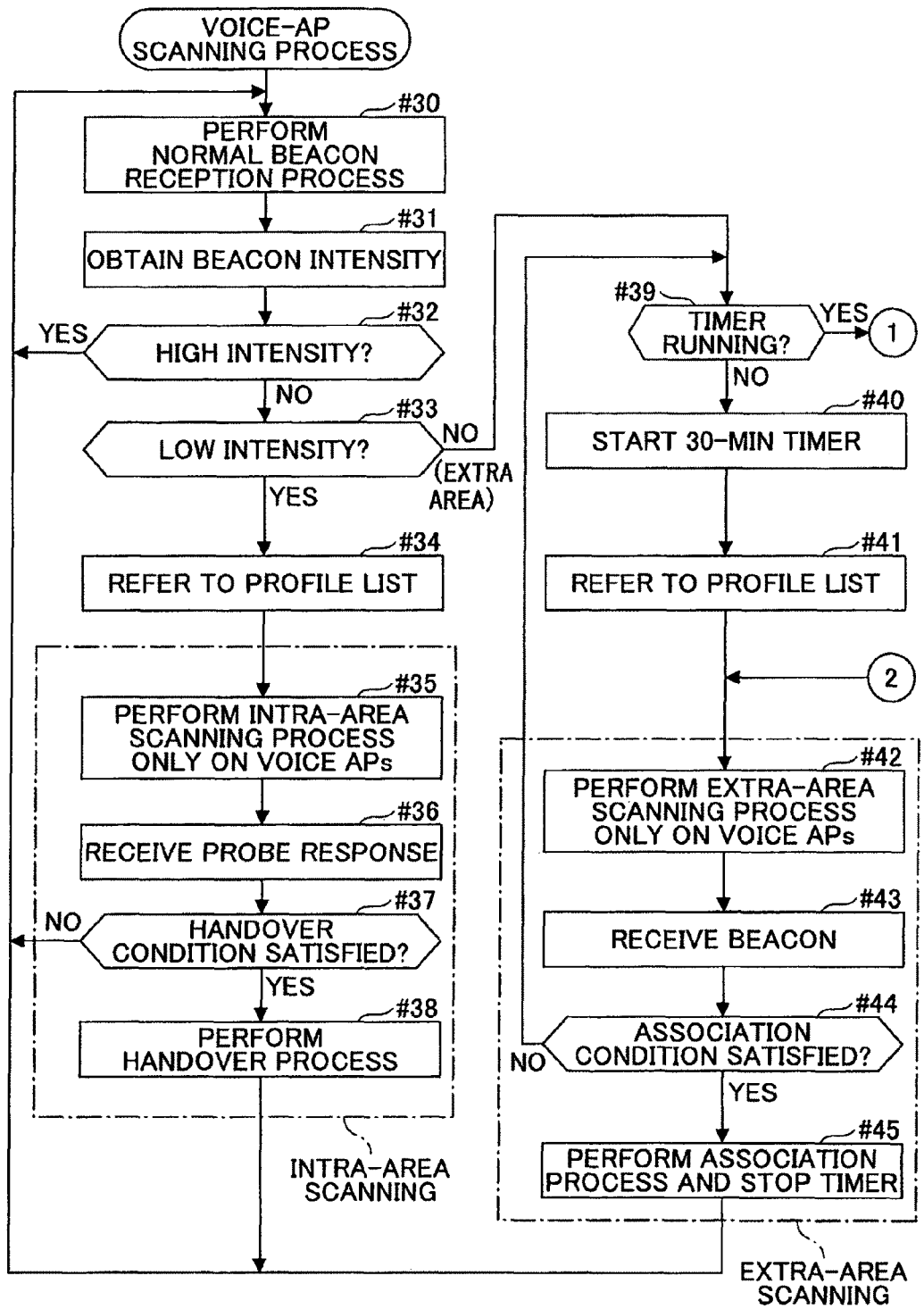
FIGS. 9A and 9B are flowcharts used to describe a voice-AP scanning process according to the first embodiment.
Figure 9B:
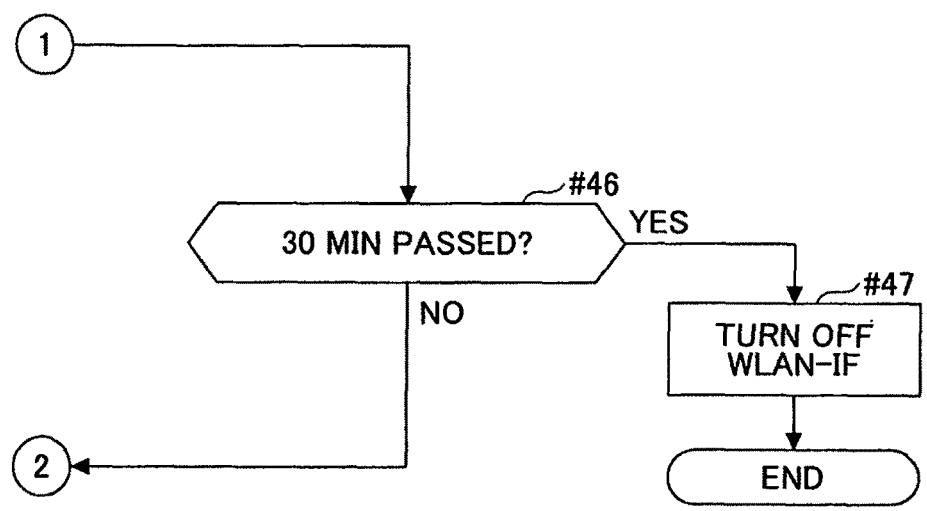

FIGS. 9A and 9B are flowcharts used to describe a voice-AP scanning process performed by the voice-AP scanning unit 14. When communication has been established with a voice AP, the voice-AP scanning unit 14 performs a normal beacon reception process to wait for a message indicating an incoming call from the AP. The voice-AP scanning unit 14 periodically obtains the intensity of the beacon from the WLAN interface 23 (#31) and determines the level of the intensity of the beacon (#32, #33). If the intensity of the beacon is greater than or equal to a first threshold (i.e., if the beacon has a high intensity) (YES in #32), the voice-AP scanning unit 14 returns to step #30. If the intensity of the beacon is lower than the first threshold and is greater than or equal to a second threshold (second threshold<first threshold) that indicates the minimum intensity for maintaining the connection (i.e., if the beacon has a low intensity) (NO in #32 and YES in #33), the voice-AP scanning unit 14 performs an intra-area scanning process (#35-#38). Prior to the intra-area scanning process, the voice-AP scanning unit 14 refers to the voice-area profile list L1 (#34).

The voice-AP scanning unit 14 performs the intra-area scanning process only on voice APs (#35). In this step, when the auto mode is specified as the scanning mode, active scanning is performed. The voice-AP scanning unit 14 receives a probe response from an AP (#36) and if the probe response satisfies a predetermined handover condition (YES in #37), performs a handover process to establish communication with the AP (#38). When the handover process is not to be performed (NO in #37), the voice-AP scanning unit 14 immediately returns to step #30. When the handover process is to be performed (YES in #37), the voice-AP scanning unit 14 returns to step #30 after the handover process.

Meanwhile, when the intensity of the beacon is less than the second threshold (NO in #33), the voice-AP scanning unit 14 performs an extra-area scanning process (#42-#45). Prior to the extra-area scanning process, the voice-AP scanning unit 14 checks the status of a 30-min timer for limiting the duration of the extra-area scanning process and determines whether the 30-min timer is running (#39). If the 30-min timer is not running (NO in #39), the voice-AP scanning unit 14 starts the 30-min timer (#40).

The voice-AP scanning unit 14 refers to the voice-area profile list L1 (#41) and performs the extra-area scanning process only on voice APs (#42). In this step, when the auto mode is specified as the scanning mode, passive scanning is performed. The voice-AP scanning unit 14 determines whether a beacon including an ESSID registered in the profile configuration information T1 and having a sufficient intensity (or satisfying an association condition, e.g., a predetermined intensity level) is received (#43, #44). If a beacon satisfying the association condition is received (YES in #44), the voice-AP scanning unit 14 performs an association process to establish communication with the corresponding AP and stops the 30-min timer (#45). After the association process, the voice-AP scanning unit 14 returns to step #30. If no beacon satisfying the association condition is received (NO in #44), the voice-AP scanning unit 14 returns to step #39.

The voice-AP scanning unit 14 determines whether 30 minutes have passed from the start of the 30-min timer (#46). If 30 minutes have not passed (NO in #46), the voice-AP scanning unit 14 repeats the extra-area scanning process. If 30 minutes have passed (YES in #46), the voice-AP scanning unit 14 turns off the WLAN interface 23 (#47).

Figure 10:
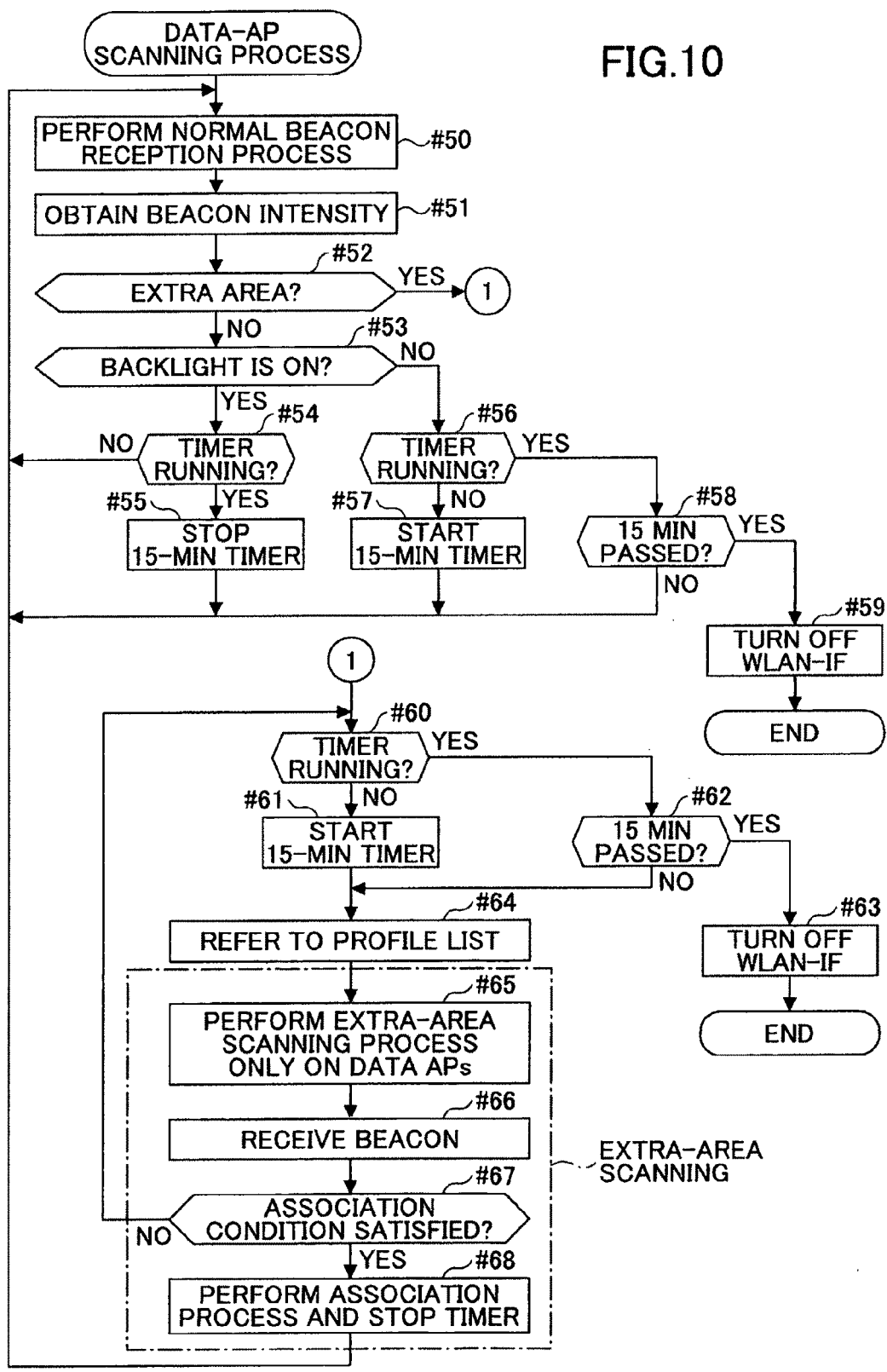
FIG. 10 is a flowchart used to describe a data-AP scanning process according to the first embodiment.

FIG. 10 is a flowchart used to describe a data-AP scanning process performed by the data-AP scanning unit 16. When communication has been established with a data AP, the data-AP scanning unit 16 performs a normal beacon reception process to monitor a beacon from the AP (#50). The data-AP scanning unit 16 periodically obtains the intensity of the beacon from the WLAN interface 23 (#51) and determines the level of the intensity of the beacon (#52).

If the intensity of the beacon is greater than or equal to the second threshold (i.e., when the mobile phone 1 is not in the out-of-service area) (NO in #52), the data-AP scanning unit checks the status of the backlight of the screen (#53). If the backlight is ON (the screen is ON), it can be assumed that the user is using or going to use a data communication service. Therefore, when the screen is ON (YES in #53), the data-AP scanning unit 16 determines whether a 15-min timer for limiting the duration of a scanning process is running (#54). If the 15-min timer is running (YES in #54), the data-AP scanning unit 16 stops the 15-min timer (#55). When the screen is OFF (NO in #53), the data-AP scanning unit 16 determines whether the 15-min timer is running (#56). If the 15-min timer is not running (NO in #56), the data-AP scanning unit 16 starts the 15-min timer (#57). When the screen is OFF (NO in #53), the 15-min timer is running (YES in #56), and 15 minutes have passed (YES in #58), the data-AP scanning unit 16 turns off the WLAN interface 23 (#59).

If the mobile phone 1 is in the out-of-service area (YES in #52), the data-AP scanning unit 16 performs an extra-area scanning process (#65-#68). Prior to the extra-area scanning process, the data-AP scanning unit 16 checks the status of the 15-min timer and determines whether the 15-min timer is running (#60). If the 15-min timer is not running (NO in #60), the data-AP scanning unit 16 starts the 15-min timer (#61).

The data-AP scanning unit 16 refers to the data-area profile list L2 (#64) and performs the extra-area scanning process only on data APs (#65). In this step, when the auto mode is specified as the scanning mode, passive scanning is performed. The data-AP scanning unit 16 determines whether a beacon including an ESSID registered in the profile configuration information T1 and having a sufficient intensity (or satisfying an association condition, e.g., a predetermined intensity level) is received (#66, #67). If a beacon satisfying the association condition is received (YES in #67), the data-AP scanning unit 16 performs an association process to establish communication with the corresponding AP and stops the 15-min timer (#68). After the association process, the data-AP scanning unit 16 returns to step #50. If no beacon satisfying the association condition is received (NO in #67), the data-AP scanning unit 16 returns to step #60. The data-AP scanning unit 16 determines whether 15 minutes have passed from the start of the 15-min timer (#62). If 15 minutes have not passed (NO in #62), the data-AP scanning unit 16 repeats the extra-area scanning process. If 15 minutes have passed (YES in #62), the data-AP scanning unit 16 turns off the WLAN interface 23 (#63).

FIGS. 11 through 14 are flowcharts used to describe a return process of returning from a standby state while communication is established with an AP.

In the standby state, the mobile phone 1 is not being used by the user and the screen is turned off to save power.

Figure 11:
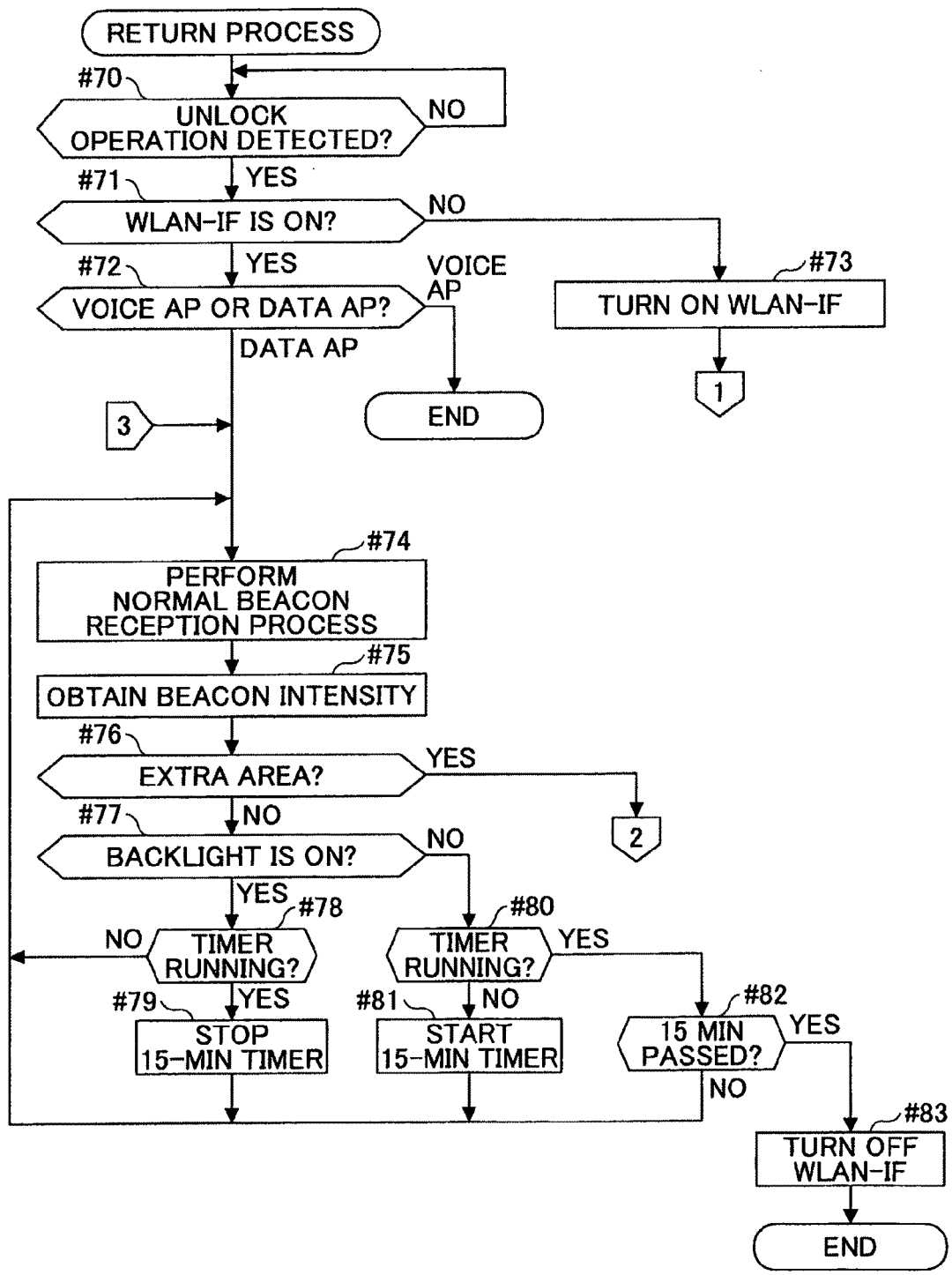
FIG. 11 is a flowchart used to describe a part of a process of returning from a standby state according to the first embodiment.
Figure 12:
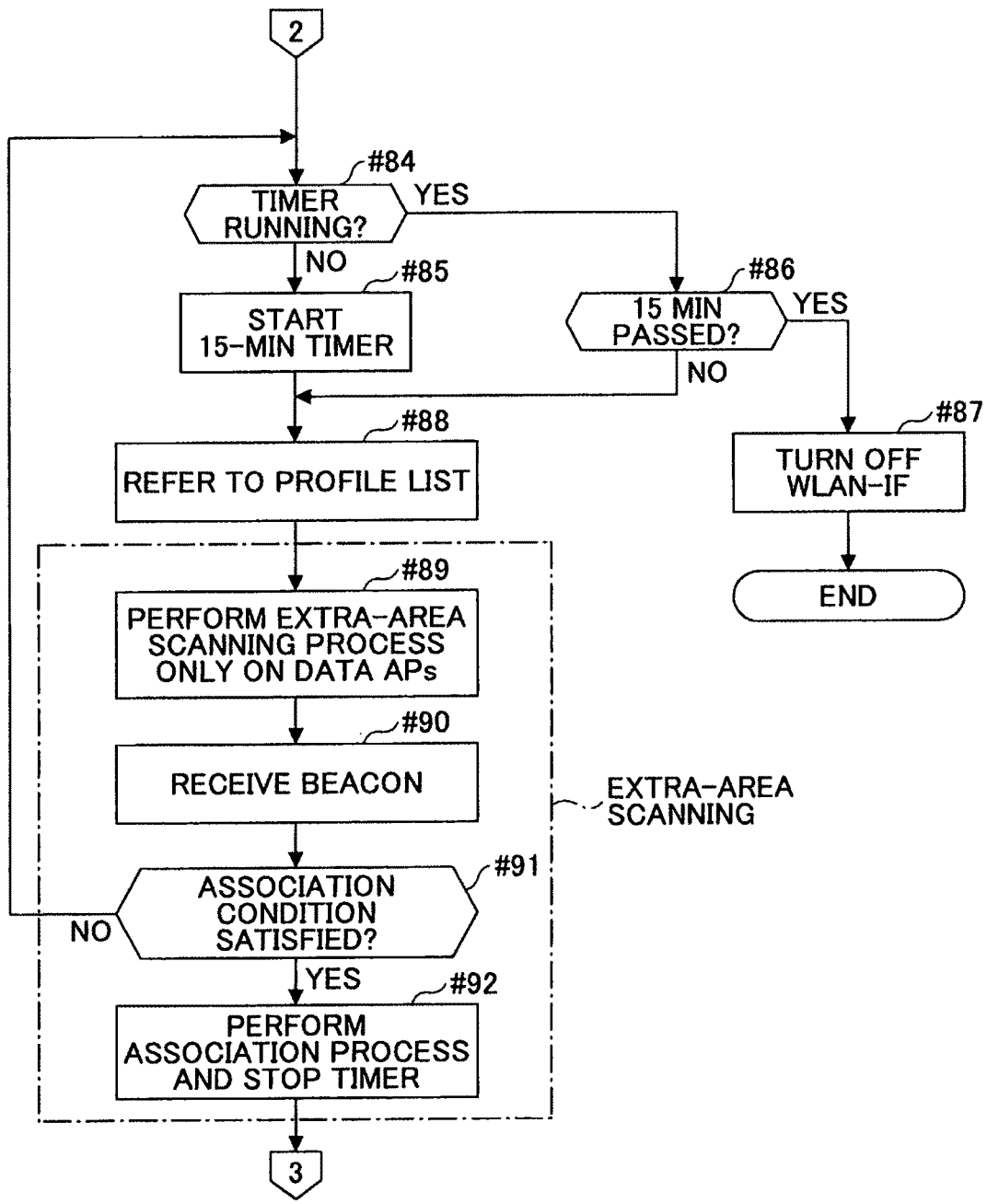
FIG. 12 is a flowchart used to describe another part of the process of returning from a standby state according to the first embodiment.

In FIG. 11, the scanning management unit 18 waits for an unlock operation by the user which causes the screen to be turned on (#70). If the unlock operation is detected (YES in #70), the scanning management unit 18 checks the status of the WLAN interface 23 (#71). If the WLAN interface 23 is OFF (NO in #71), the scanning management unit 18 turns on the WLAN interface 23 (#73) and performs a process illustrated in FIGS. 13 and 14. If the WLAN interface 23 is ON (YES in #71), the scanning management unit 18 determines whether the mobile phone 1 is connected via the WLAN interface 23 with a voice AP or a data AP (#72). If the mobile phone 1 is connected with a voice AP, the return process is not performed (or the return process is terminated). If the mobile phone 1 is connected to a data AP, the data-AP scanning unit 16 performs a data-AP scanning process (#74-#92) illustrated in FIGS. 11 and 12. The data-AP scanning process (#74-#92) is substantially the same as that illustrated in FIG. 10 (#50-#68) and therefore descriptions of the data-AP scanning process are omitted here.

Figure 13:
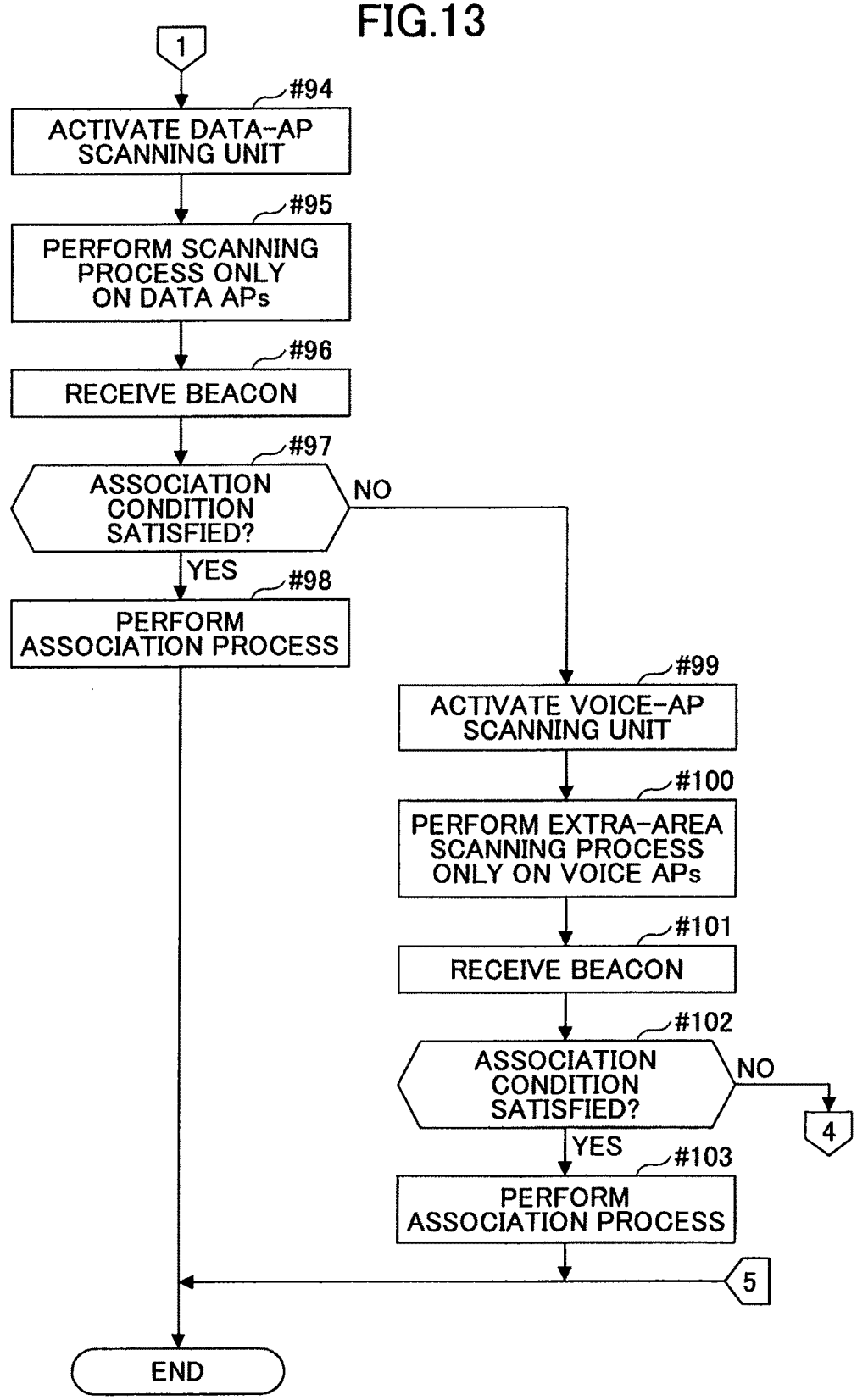
FIG. 13 is a flowchart used to describe another part of the process of returning from a standby state according to the first embodiment.

In FIG. 13, the scanning management unit 18 activates the data-AP scanning unit 16 (#94).

The data-AP scanning unit 16 performs a scanning process only on data APs (#95) and determines whether a beacon including an ESSID registered in the profile configuration information T1 and having a sufficient intensity (or satisfying an association condition, e.g., a predetermined intensity level) is received (#96, #97). If a beacon satisfying the association condition is received (YES in #97), the data-AP scanning unit 16 performs an association process (#98). If no beacon satisfying the association condition is satisfied (NO in #97), the scanning management unit 18 activates the voice-AP scanning unit 14 (#99).

The voice-AP scanning unit 14 performs an extra-area scanning process only on voice APs (#100) and determines whether a beacon including an ESSID registered in the profile configuration information T1 and having a sufficient intensity (or satisfying an association condition, e.g., a predetermined intensity level) is received (#101, #102). If a beacon satisfying the association condition is received (YES in #102), the voice-AP scanning unit 14 performs an association process (#103). If no beacon satisfying the association condition is received (NO in #102), the voice-AP scanning unit 14 proceeds to step #104 in FIG. 14.

Figure 14:
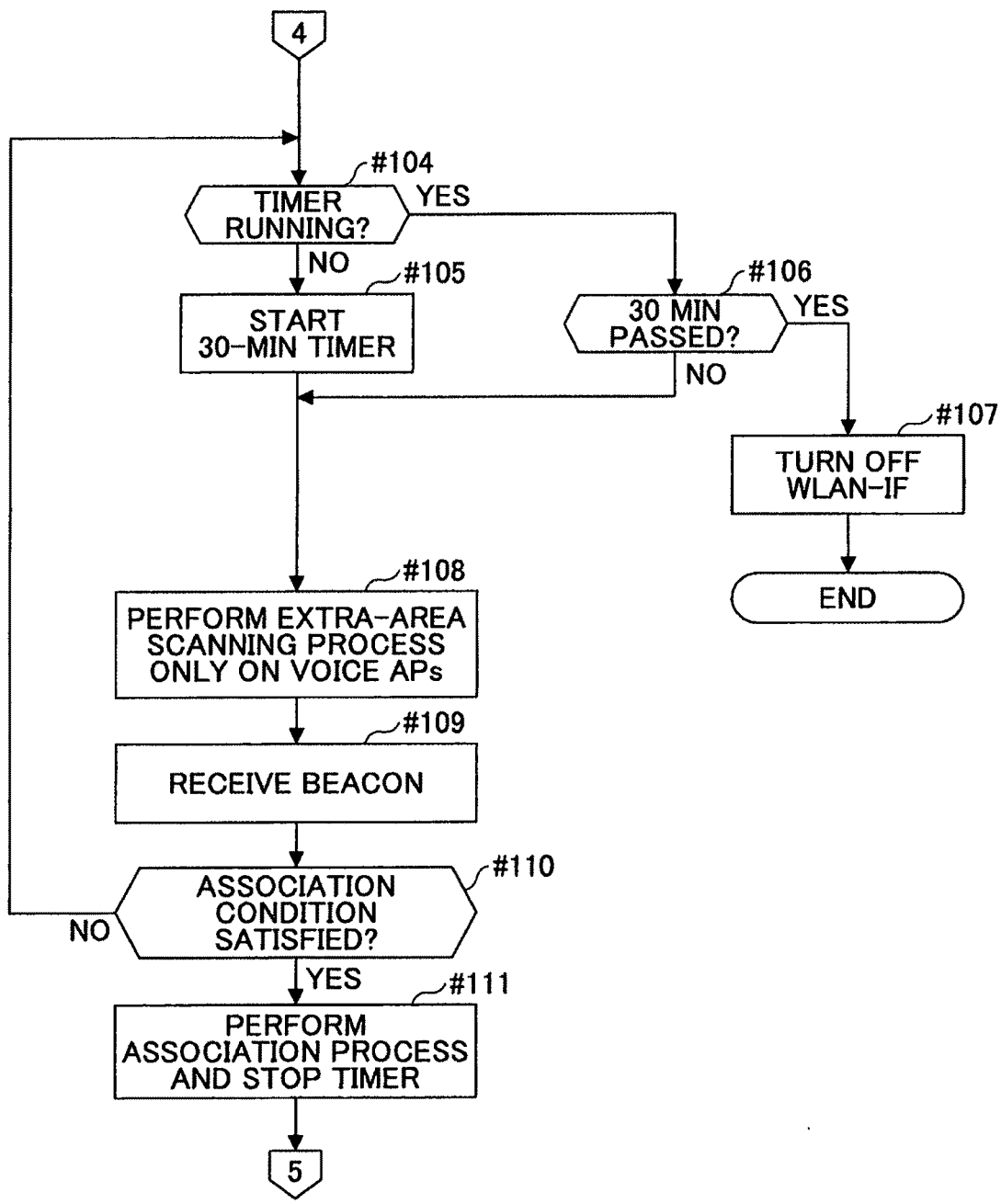
FIG. 14 is a flowchart used to describe another part of the process of returning from a standby state according to the first embodiment.

In FIG. 14, the voice-AP scanning unit 14 checks the status of a 30-min timer for limiting the duration of the extra-area scanning process and determines whether the 30-min timer is running (#104). If the 30-min timer is not running (NO in #104), the voice-AP scanning unit 14 starts the 30-min timer (#105). Then, the voice-AP scanning unit 14 performs the extra-area scanning process only on voice APs (#108). In this step, when the auto mode is specified as the scanning mode, passive scanning is performed. The voice-AP scanning unit 14 determines whether a beacon including an ESSID registered in the profile configuration information T1 and having a sufficient intensity (or satisfying an association condition, e.g., a predetermined intensity level) is received (#109, #110). If a beacon satisfying the association condition is received (YES in #110), the voice-AP scanning unit 14 performs an association process and stops the 30-min timer (#111). If no beacon satisfying the association condition is received (NO in #110), the voice-AP scanning unit 14 returns to step #104. The voice-AP scanning unit 14 determines whether 30 minutes have passed from the start of the 30-min timer (#106). If 30 minutes have not passed (NO in #106), the voice-AP scanning unit 16 repeats the extra-area scanning process. If 30 minutes have passed (YES in #106), the voice-AP scanning unit 14 turns off the WLAN interface 23 (#107).

Second Embodiment

Figure 16:
FIG. 16 is a table used to describe operations of a radio communication device in various situations according to the second embodiment.

In the second embodiment, the driving power is continuously supplied to the WLAN interface 23 regardless of situations. FIG. 15 is a table used to describe operations of the mobile phone 1 in communication areas according to the second embodiment. FIG. 16 is a table used to describe operations of the mobile phone 1 in various situations according to the second embodiment. In FIGS. 15 and 16, operations that are different from those in FIGS. 3 and 4 are underlined to clarify the differences between the first embodiment and the second embodiment.

[Case 1b]

When the field intensity of a beacon from an associated (or connected) AP in the voice-AP communication area is sufficiently high (high field intensity), the voice-AP scanning unit 14 receives the beacon, which is transmitted at regular intervals (e.g., at 100 ms intervals) from the AP, at an interval of, for example, 5 seconds and monitors the field intensity of the received beacon (beacon reception process).

In this case, the data-AP scanning unit 16 is inactive.

[Case 2b]

When the field intensity of a beacon from an associated AP is relatively low (low field intensity) in the voice-AP communication area, the voice-AP scanning unit 14 performs a scanning process (i.e., a handover process) to search for another AP. In this case, the scanning process is performed based only on the profiles registered in the voice-AP profile list L1. That is, the data-AP scanning unit 16 is inactive and APs corresponding to the profiles registered in the data-AP profile list L2 are not searched. Compared with a method where all APs including data APs are searched, this method makes it possible to more quickly find a desired AP since only voice APs are searched. This in turn makes it possible to reduce the power consumption, and also makes it possible to reduce an interruption or noise caused by the scanning process during a telephone conversation and to improve the voice quality.

[Case 3b]

When communication is established with an AP in the data-AP communication area, the voice-AP scanning unit 14 is inactive and the data-AP scanning unit 16 performs a beacon reception process.

[Case 4b]

When the backlight of the liquid crystal panel is turned off (the screen is turned off) to save power while the data-AP scanning unit 16 is performing a beacon reception process and a predetermined period of time (e.g., 0, 5, or 15 minutes) passes after the backlight is turned off, the data-AP scanning unit 16 stops the beacon reception process (becomes inactive). When the data-AP scanning unit 16 becomes inactive, the voice-AP scanning unit 14 starts an extra-area scanning process according to the fixed-interval method.

[Case 5b]

When the screen is turned on in response to a user operation while the data-AP scanning unit 16 is inactive in the data-AP communication area, the data-AP scanning unit 16 performs a scanning process to search for an AP. The scanning process is performed on APs corresponding to the profiles registered in the data-AP profile list L2. Concurrently, the voice-AP scanning unit 14 continues the extra-area scanning process that has already been started. When finding an AP, the data-AP scanning unit 16 performs an authentication process and an association process with the AP and as a result, the mobile phone 1 is associated with the AP. When the association is reported by the data-AP scanning unit 16 to the scanning management unit 18, the scanning management unit 18 immediately deactivates the voice-AP scanning unit 14.

Cases 6b through 11b are described below with reference to FIG. 16.

[Case 6b]

When the mobile phone 1 moves from the voice-AP communication area to the out-of-service area (extra area) as indicated by an arrowed dotted line in FIG. 16, the voice-AP scanning unit 14 starts an extra-area scanning process. Meanwhile, the data-AP scanning unit 16 is inactive. In this case, the extra-area scanning process is performed according to the variable-interval method the reception of a beacon (in the passive mode) or the broadcasting of a probe request (in the active mode) is performed frequently (at a short interval) immediately after the extra-area scanning process is started, and the interval is gradually increased thereafter. For example, the interval is changed from two seconds up to five minutes. In the second embodiment, unlike the first embodiment, the voice-AP scanning unit 14 does not become inactive (or the extra-area scanning process is not stopped) even if no AP is found after a predetermined period of time (e.g., 30 minutes).

[Case 7b]

When the user operates the mobile phone 1 to turn on (or unlock) the screen in the out-of-service area, the voice-AP scanning unit 14 continues the extra-area scanning process that has already been started. In parallel with the extra-area scanning process by the voice-AP scanning unit 14, the data-AP scanning unit 16 performs an extra-area scanning process. If no AP is found after trying all channels defined in the registered data-AP profiles, the data-AP scanning unit 16 becomes inactive.

[Case 8b]

When the mobile phone 1 moves from a data-AP communication area to the out-of-service area during communications, the data-AP scanning unit 16 performs a scanning process based on history information to search for an AP in a data-AP communication area to which a most-recently-connected AP belongs. In this case, the voice-AP scanning unit 14 is inactive. In this case, no AP will be found. Therefore, after a predetermined period of time (e.g., 0, 5, or 15 minutes) from when the screen is turned off, the data-AP scanning unit 16 becomes inactive. Then, after the data-AP scanning unit 16 becomes inactive, the voice-AP scanning unit 14 starts an extra-area scanning process.

[Case 9b]

When the mobile phone 1 moves from the data-AP communication area into the out-of-service area with the screen turned off and then the user operates the mobile phone 1 to turn on (or unlock) the screen in the out-of-service area, the data-AP scanning unit 16 starts an extra-area scanning process. Meanwhile, the voice-AP scanning unit 14 continues the extra-area scanning process that has already been started. In this case, no AP will be found. Therefore, the data-AP scanning unit 16 becomes inactive after performing the scanning process using channels registered in the data-area profiles. Also in this case, the WLAN interface 23 is not turned off and the voice-AP scanning unit 14 continues the extra-area scanning process.

[Case 10b]

When the mobile phone 1 moves from the out-of-service area into the voice-AP communication area while the voice-AP scanning unit 14 is performing an the extra-area scanning process, the voice-AP scanning unit 14 finds an AP and starts an association process. In this case, the data-AP scanning unit 16 is inactive.

[Case 11b]

When the mobile phone 1 moves from the out-of-service area into the voice-AP communication area while the voice-AP scanning unit 14 is performing an the extra-area scanning process and then the user operates the mobile phone 1 to turn on (or unlock) the screen in the voice-AP communication area, the data-AP scanning unit 16 starts an extra-area scanning process. When the voice-AP scanning unit 14 finds an AP and the mobile phone 1 is associated with the AP, the scanning management unit 18 deactivates the data-AP scanning unit 16.

FIG. 17 is a table used to describe operations of the voice-AP scanning unit 14 and the data-AP scanning unit 16 in different scanning modes.

[Operations of Voice-AP Scanning Unit]

In the voice-AP communication area, the voice-AP scanning unit 14 performs the active scanning at a 5-s interval if the auto mode or the active mode is specified, or performs the passive scanning at a 5-s interval if the passive mode is specified. In the out-of-service area, the voice-AP scanning unit 14 performs the passive scanning if the auto mode or the passive mode is specified, or performs the active scanning if the active mode is specified. In the out-of-service area, the scanning process is performed according to the variable-interval method when the mobile phone 1 is in the standby state and is performed according to the fixed-interval method when the screen is ON. While communication is established and the mobile phone is connected with a data AP in the data-AP communication area, the voice-AP scanning unit 14 is inactive regardless of the scanning mode. When the mobile phone 1 is not connected in the data-AP communication area, the voice-AP scanning unit 14 performs the passive scanning if the auto mode or the passive mode is specified, or performs the active scanning if the active mode is specified. When a connectable WLAN AP list is to be displayed in response to a user operation, the voice-AP scanning unit 14 performs the passive scanning based on the voice-AP profiles regardless of the scanning mode.

[Operations of Data-AP Scanning Unit]

When, for example, 15 minutes passes after the screen is turned off while the mobile phone 1 is connected with an AP, the data-AP scanning unit 16 stops the beacon reception process regardless of the scanning mode. As a result, the connection is terminated. When the mobile phone 1 connected with an AP moves from the data-AP communication area to the out-of-service area, the data-AP scanning unit 16 performs the passive scanning on APs in the history information if the auto mode or the passive mode is specified, or performs the active scanning on APs in the history information if the active mode is specified. When the screen is turned on, the data-AP scanning unit 16 performs the passive scanning on APs in the history information if the auto mode or the passive mode is specified, or performs the active scanning on APs in the history information if the active mode is specified. After an AP is found, the data-AP scanning unit 16 starts the beacon reception process regardless of the scanning mode. When an AP is found by the voice-AP scanning unit 14, the data-AP scanning unit 16 stops the scanning process regardless of the scanning mode. When a connectable WLAN AP list is to be displayed, the data-AP scanning unit 16 performs the passive scanning based on the data-AP profiles regardless of the scanning mode. Even if the field intensity of the beacon becomes low while the mobile phone 1 is connected with an AP, the data-AP scanning unit 16 does not perform a handover process and continues the beacon reception process.

Operations of the mobile phone 1 of the second embodiment are described below with reference to flowcharts. In the flowcharts, it is assumed that the auto mode is specified as the scanning mode.

Figure 18:
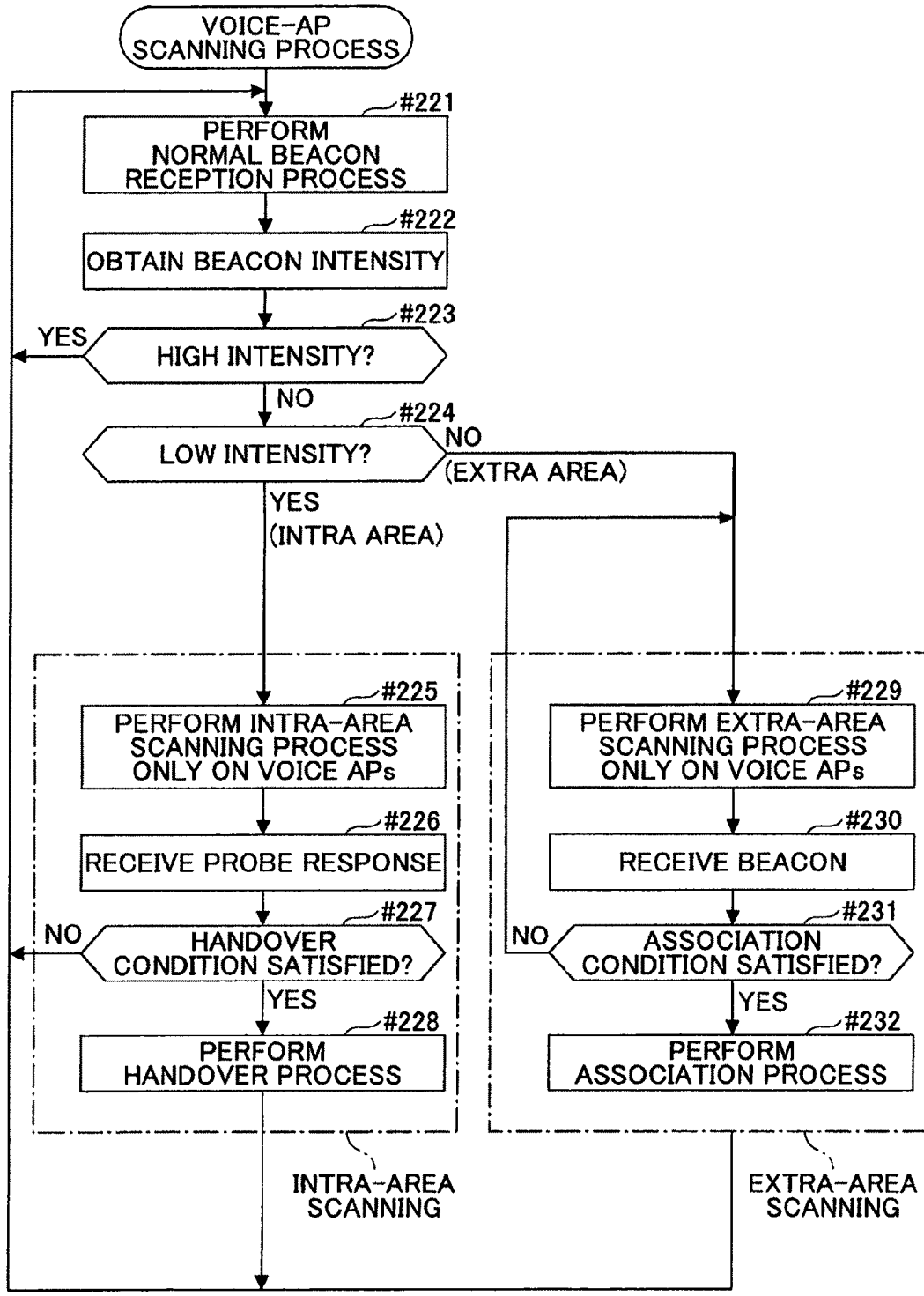
FIG. 18 is a flowchart used to describe a voice-AP scanning process according to the second embodiment.

FIG. 18 is a flowchart used to describe a voice-AP scanning process performed by the voice-AP scanning unit 14. When communication is established and the mobile phone 1 is connected with a voice AP, the voice-AP scanning unit 14 performs a normal beacon reception process to wait for a message indicating an incoming call from the AP (#221). The voice-AP scanning unit 14 periodically obtains the intensity of the beacon from the WLAN interface 23 (#222) and determines the level of the intensity of the beacon (#223, #224). If the intensity of the beacon is greater than or equal to a first threshold (i.e., if the beacon has a high intensity) (YES in #223), the voice-AP scanning unit 14 returns to step #221. If the intensity of the beacon is lower than the first threshold and is greater than or equal to a second threshold (second threshold<first threshold) that indicates the minimum intensity for maintaining the connection (i.e., if the beacon has a low intensity) (NO in #223 and YES in #224), the voice-AP scanning unit 14 performs an intra-area scanning process (#225-#228).

The voice-AP scanning unit 14 performs the intra-area scanning process only on voice APs. When the auto mode is specified as the scanning mode, active scanning is performed. In this case, the voice-AP scanning unit 14 receives a probe response from an AP (#226) and if the intensity of the probe response satisfies a predetermined handover condition (YES in #227), performs a handover process to establish communication with the AP (#228). When the handover process is not to be performed (NO in #227), the voice-AP scanning unit 14 immediately returns to step #221. When the handover process is to be performed (YES in #227), the voice-AP scanning unit 14 returns to step #221 after the handover process.

Meanwhile, when the intensity of the beacon is less than the second threshold (NO in #224), the voice-AP scanning unit 14 performs an extra-area scanning process (#229-#232). The voice-AP scanning unit 14 refers to the voice-area profile list L1 and performs the extra-area scanning process only on voice APs (#229). In this step, when the auto mode is specified as the scanning mode, passive scanning is performed. The voice-AP scanning unit 14 determines whether a beacon including an ESSID registered in the profile configuration information T1 and having a sufficient intensity (or satisfying an association condition, e.g., a predetermined intensity level) is received (#230, #231)). If a beacon satisfying the association condition is received (YES in #231), the voice-AP scanning unit 14 performs an association process to establish a connection with the corresponding AP (#232). After the association process, the voice-AP scanning unit 14 returns to step #221. If no beacon satisfying the association condition is received (NO in #231), the voice-AP scanning unit 14 returns to step #229 and continues the extra-area scanning process.

Figure 19:
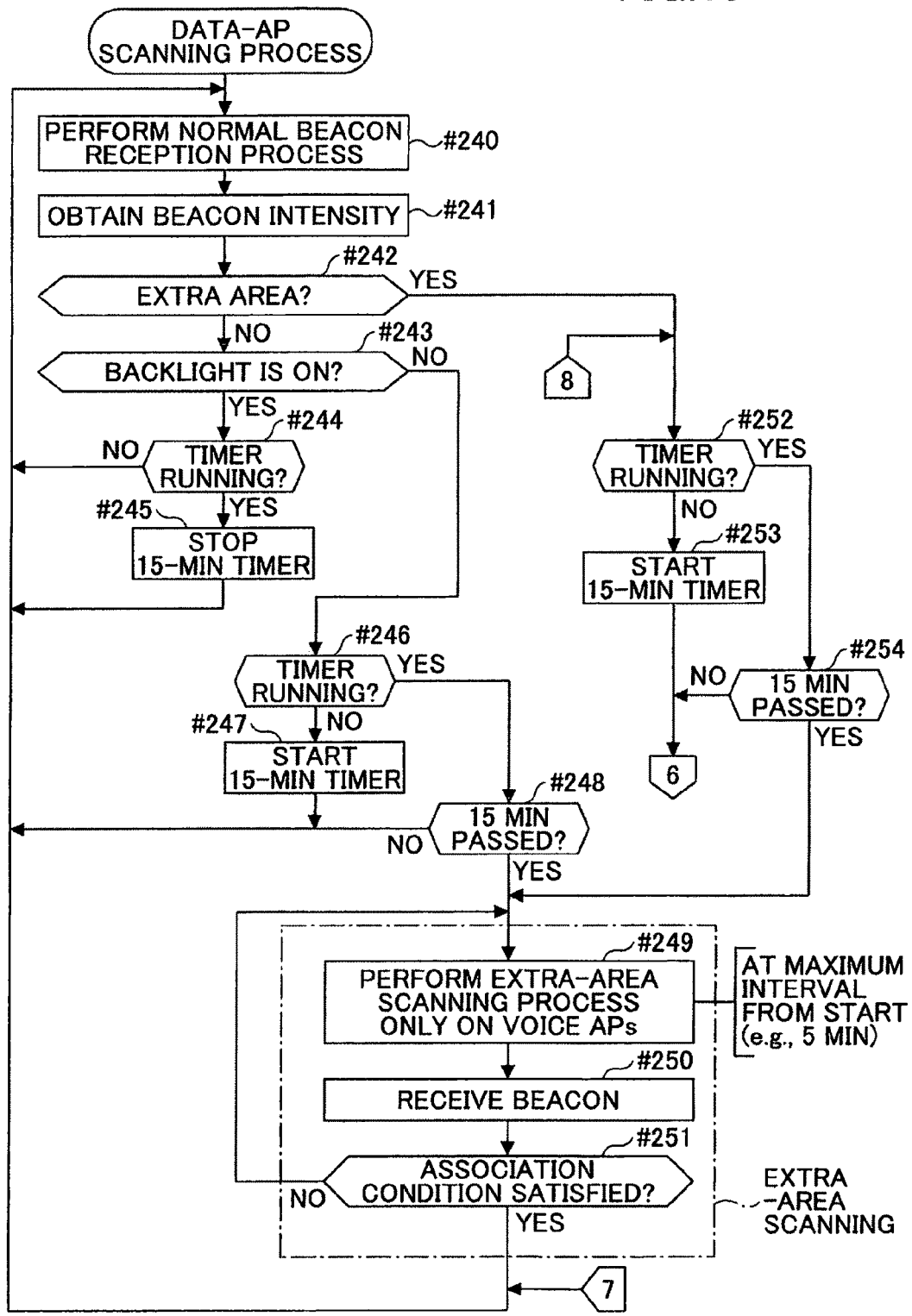
FIG. 19 is a flowchart used to describe a part of a data-AP scanning process according to the second embodiment.
Figure 20:
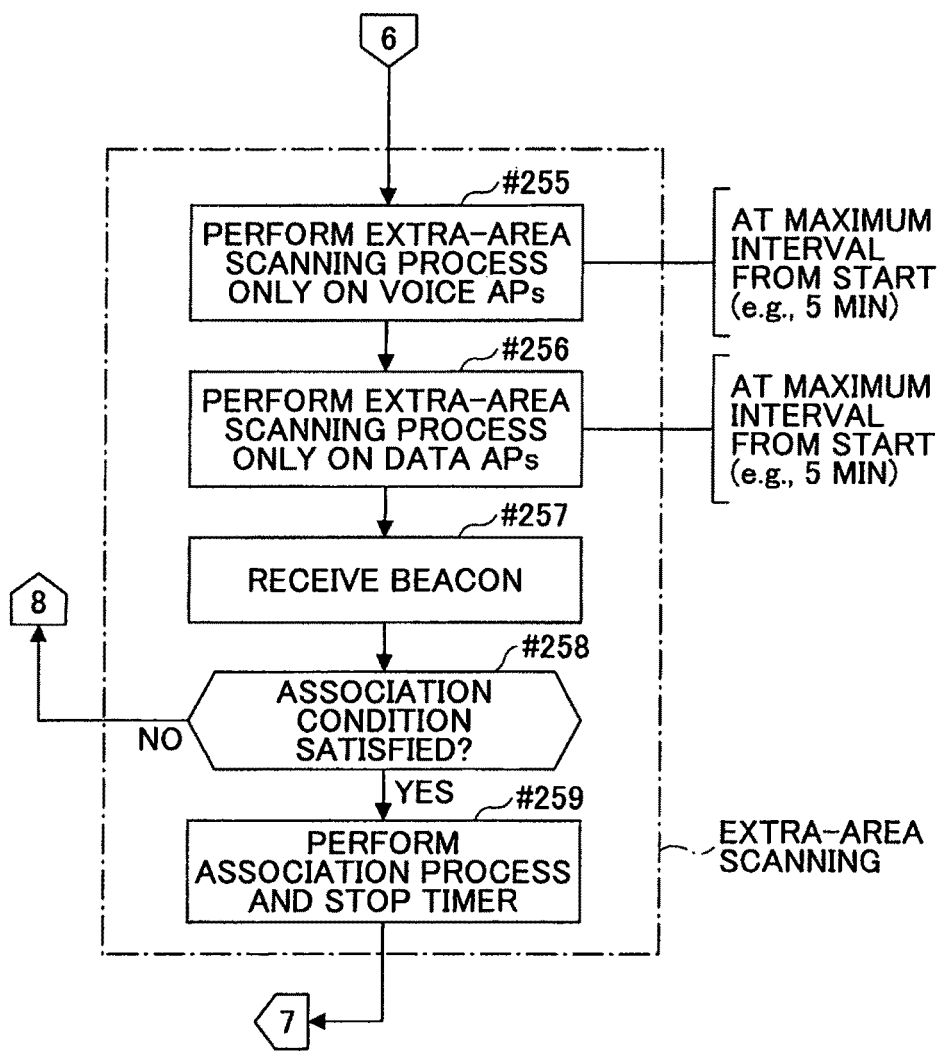
FIG. 20 is a flowchart used to describe another part of the data-AP scanning process according to the second embodiment.

FIGS. 19 and 20 are flowcharts used to describe a data-AP scanning process performed by the data-AP scanning unit 16 and the voice-AP scanning unit 14. When communication is established and the mobile phone 1 is connected with a data AP, the data-AP scanning unit 16 performs a normal beacon reception process to monitor a beacon from the AP (#240). The data-AP scanning unit 16 periodically obtains the intensity of the beacon from the WLAN interface 23 (#241) and determines the level of the intensity of the beacon (#242).

If the intensity of the beacon is greater than or equal to the second threshold (i.e., when the mobile phone 1 is not in the out-of-service area) (NO in #242), the data-AP scanning unit checks the status of the backlight of the screen (#243).

If the backlight is ON (the screen is ON), it can be assumed that the user is using or going to use a data communication service. Therefore, when the screen is ON (YES in #243), the data-AP scanning unit 16 determines whether a 15-min timer for limiting the duration of a scanning process is running (#244). If the 15-min timer is running (YES in #244), the data-AP scanning unit 16 stops the 15-min timer (#245). When the screen is OFF (NO in #243) and the 15-min timer is not running (NO in #246), the data-AP scanning unit 16 starts the 15-min timer (#247). When the screen is OFF (NO in #243), the 15-min timer is running (YES in #246), and 15 minutes have passed (YES in #248), the data-AP scanning unit 16 becomes inactive and the voice-AP scanning unit 14 performs an extra-area scanning process (#249-#251).

The voice-AP scanning unit 14 performs the extra-area scanning process only on voice APs corresponding to the profiles registered in the voice-area profile list L1 (#249). In this step, when the auto mode is specified as the scanning mode, passive scanning is performed. The voice-AP scanning unit 14 determines whether a beacon including an ESSID registered in the profile configuration information T1 and having a sufficient intensity (or satisfying an association condition, e.g., a predetermined intensity level) is received (#250, #251). The voice-AP scanning unit 14 continues the extra-area scanning process until the association condition is satisfied. However, even during this process, the voice-AP scanning unit 14 may be deactivated by the scanning management unit 18.

When the mobile phone 1 is in the out-of-service area (YES in #242), the data-AP scanning unit 16 and the voice-AP scanning unit 14 perform extra-area scanning processes as illustrated in FIG. 20. Prior to the extra-area scanning process, the data-AP scanning unit 16 checks the status of the 15-min timer and determines whether the 15-min timer is running (#252 in FIG. 19). If the 15-min timer is not running (NO in #252), the data-AP scanning unit 16 starts the 15-min timer (#253).

In FIG. 20, the voice-AP scanning unit 16 performs the extra-area scanning process only on voice APs (#255) and the data-AP scanning unit 16 performs the extra-area scanning process only on data APs (#256). In these steps, when the auto mode is specified as the scanning mode, passive scanning is performed. When receiving a beacon from an AP (#257), the voice-AP scanning unit 14 or the data-AP scanning unit 16 determines whether the intensity of the beacon satisfies an association condition (#258). If the beacon satisfies the association condition (YES in #258), the voice-AP scanning unit 14 or the data-AP scanning unit 16 performs an association process and stops the 15-min timer (#259). After the association process, the process returns to step #240 and a normal beacon reception process is performed. If no beacon satisfying the association condition is received (NO in #258), the process returns to step #252. Until 15 minutes passes from the start of the 15-min timer, the voice-AP scanning unit 14 and the data-AP scanning unit 16 perform the extra-area scanning processes. After 15 minutes passes, only the voice-AP scanning unit 14 performs the extra-area scanning process (#249-#251).

Figure 21:
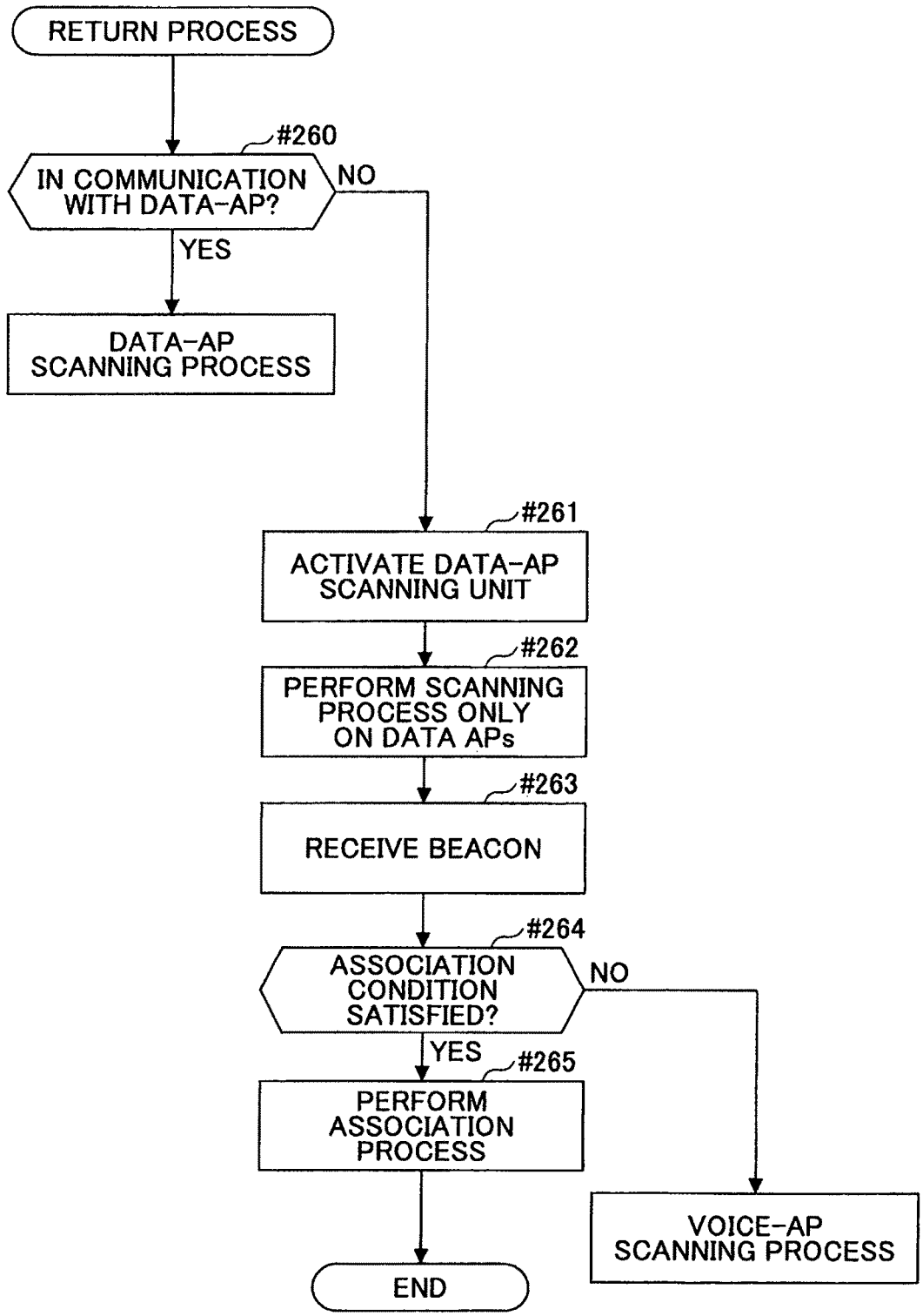
FIG. 21 is a flowchart used to describe a process of returning from a standby state according to the second embodiment.

FIG. 21 is a flowchart used to describe a return process of returning from a standby state while communication is established with an AP. In the standby state, the mobile phone 1 is not being used by the user and the screen is turned off to save power.

The return process illustrated in FIG. 21 is performed in response to a user operation for turning on (or unlocking) the screen. If communications are being performed via a data AP when the user operation is detected (YES in #260), a data-AP scanning process as described with reference to FIGS. 19 and 20 is performed. Meanwhile, if communications via a data AP are not being performed (NO in #260), the scanning management unit 18 activates the data-AP scanning unit 16 (#261).

Then, the data-AP scanning unit 16 performs a scanning process only on data APs (#262).

When receiving a beacon from a data AP (#263), the data-AP scanning unit 16 determines whether the intensity of the beacon satisfies an association condition (#264). If the intensity of the beacon satisfies the association condition (YES in #264), the data-AP scanning unit 16 performs an association process (#265). If the intensity of the beacon does not satisfy the association condition (NO in #264), a voice-AP scanning process as described with reference to FIG. 18 is performed.

Although the mobile phone 1 is used as an example of a radio communication device in the above embodiments, the present invention may also be applied to other types of devices including a WLAN interface such as a notebook computer and a personal digital assistant (PDA). Further, the present invention may be applied to fixed radio communication devices in addition to portable radio communication devices.

In the above embodiments, radio communication areas are categorized into two types based on whether they support voice communications. However, radio communication areas may be categorized into three or more types and a radio communication device may be configured to select an appropriate scanning process depending on the type of the radio communication area. For example, different scanning processes may be associated with a communication area dedicated for email communications and a communication area for sending environmental information such as an ambient temperature around a radio communication device to a server.

An aspect of this disclosure enables a radio communication device to switch scanning processes according to communication conditions (e.g., whether a radio station supports voice communications and whether the radio communication device is located in a communication area of a radio station).

Figure 22:
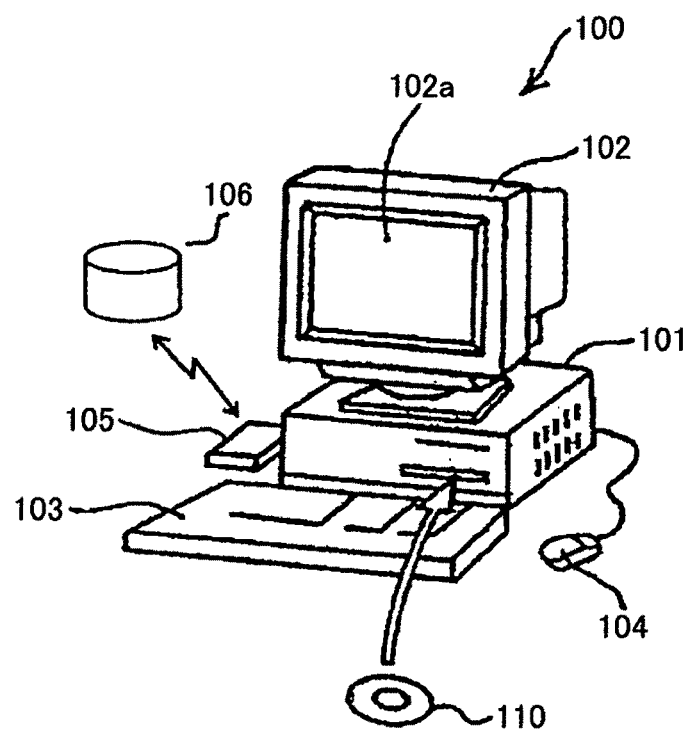
FIG. 22 is a drawing illustrating an exemplary computer system.

Another aspect of this disclosure provides a computer-readable non-transitory medium storing a communication program that causes a computer to execute a procedure as described in the above embodiments. FIG. 22 illustrates an exemplary computer system 100 usable to execute the procedure. As illustrated in FIG. 22, the computer system 100 includes a main unit 101 including a CPU and a disk drive, a display 102 for displaying an image on a display screen 102*a* according to a request from the main unit 101, a keyboard 103 for inputting information into the computer system 100, a mouse 104 for pointing a position on the display screen 102*a*, and a modem 105 used to access another computer system to download programs or information stored in a storage medium 106 of the other computer system. Also in FIG. 22, 110 indicates a storage medium that is readable by the computer system 100. The storage medium 106 and/or the storage medium 110 stores a communication program that causes the computer system 100 to execute a procedure as described in the above embodiments. Examples of the storage medium 106 and the storage medium 110 include an IC card memory, a flexible disk, a magneto optical disk, a CD-ROM, and a digital versatile disc (DVD).

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A radio communication device communicating with other communication devices via radio stations, the radio communication device comprising:
   a processor configured to execute a procedure, including
      managing radio station profiles including identification information of the radio stations and type information indicating whether the radio stations support voice communications, respectively;
      receiving a signal including the identification information from one of the radio stations;
      selecting one or both of a first scanning procedure and a second scanning procedure to be performed based on the type information of the one of the radio stations that corresponds to the identification information in the received signal; and
      performing the selected one or both of the first scanning procedure and the second scanning procedure, wherein
      the first scanning procedure is performed for a first period of time on the radio stations corresponding to the radio station profiles and supporting the voice communications to find a radio station to be connected; and
      the second scanning procedure is performed for a second period of time on the radio stations corresponding to the radio station profiles and not supporting the voice communications to find a radio station to be connected, and
   wherein the second period of time is less than the first period of time.

2. The radio communication device as claimed in claim 1, wherein when an intensity of the received signal is less than a predetermined minimum intensity, and the processor is configured to
   perform the first scanning procedure for the first period of time and also the second scanning procedure for the second period of time.

3. The radio communication device as claimed in claim 2, wherein when a connection is established with a radio station found by one of the first scanning procedure and the second scanning procedure that are being performed concurrently the processor is configured to stop the other one of the first scanning procedure and the second scanning procedure.

4. The radio communication device as claimed in claim 2, wherein when the radio communication device is connected with a radio station supporting the voice communications and an intensity of a signal from the radio station supporting the voice communications becomes less than a threshold that is greater than the minimum intensity, the processor is configured to perform the first scanning procedure and not perform the second scanning procedure.

5. A computer-readable, non-transitory medium storing a communication program that causes a computer to execute a procedure, the procedure comprising:

managing radio station profiles including identification information of the radio stations and type information indicating whether the respective radio stations support voice communications;

receiving a signal including the identification information from one of the radio stations;

selecting one or both of a first scanning process and a second scanning process to be performed based on the type information of the one of the radio stations that corresponds to the identification information in the received signal; and performing the selected one or both of the first scanning process and the second scanning process, wherein the first scanning process is performed for a first period of time on the radio stations corresponding to the radio station profiles and supporting the voice communications to find a radio station to be connected; and the second scanning process is performed for a second period of time on the radio stations corresponding to the radio station profiles and not supporting the voice communications to find a radio station to be connected, and wherein the second period of time is less than the first period of time.

6. A radio communication method performed by a radio communication device communicating with other communication devices via radio stations, the radio communication method comprising:

managing radio station profiles including identification information of the radio stations and type information indicating whether the respective radio stations support voice communications;

receiving a signal including the identification information from one of the radio stations;

selecting one or both of a first scanning process and a second scanning process to be performed based on the type information of the one of the radio stations that corresponds to the identification information in the received signal; and performing the selected one or both of the first scanning process and the second scanning process, wherein the first scanning process is performed for a first period of time on the radio stations corresponding to the radio station profiles and supporting the voice communications to find a radio station to be connected; and the second scanning process is performed for a second period of time on the radio stations corresponding to the radio station profiles and not supporting the voice communications to find a radio station to be connected, and wherein the second period of time is less than the first period of time.

* * * * *